United States Patent [19]

Buma et al.

[11] Patent Number: 4,728,120
[45] Date of Patent: Mar. 1, 1988

[54] SUSPENSION CONTROLLER

[75] Inventors: Shuuichi Buma, Toyota; Toshio Onuma, Susono; Kaoru Ohashi, Okazaki; Masami Itou, Toyota, all of Japan

[73] Assignee: Toyota Jidosha Kabushiki Kaisha, Japan

[21] Appl. No.: 913,419

[22] Filed: Sep. 30, 1986

[30] Foreign Application Priority Data

Oct. 3, 1985 [JP] Japan ............................ 60-221656
Nov. 22, 1985 [JP] Japan ............................ 60-263556

[51] Int. Cl.⁴ .................................................. B60G 11/26
[52] U.S. Cl. .................................... 280/707; 364/424
[58] Field of Search ............... 280/6 R, 6.1, 6 H, 701; 180/41; 364/424

[56] References Cited

U.S. PATENT DOCUMENTS

| | | | |
|---|---|---|---|
| 4,468,050 | 8/1984 | Woods et al. | 280/707 |
| 4,568,096 | 2/1986 | Yew et al. | 280/6.1 |
| 4,589,676 | 5/1986 | Meloche et al. | 280/707 |
| 4,639,014 | 1/1987 | Tanaka et al. | 280/707 |

FOREIGN PATENT DOCUMENTS

| | | | |
|---|---|---|---|
| 57-138406 | 2/1981 | Japan . | |
| 5830542 | 7/1981 | Japan . | |
| 2170155 | 7/1986 | United Kingdom | 280/707 |

Primary Examiner—John J. Love
Assistant Examiner—Ross Weaver
Attorney, Agent, or Firm—Parkhurst & Oliff

[57] ABSTRACT

A suspension controller for a vehicle is provided to effectively absorb vibrations such as resonant vibration of the mass of the wheel when the wheel is not on the ground, namely, "resonant vibration of unsprung mass". The suspension controller includes: a vehicle height detection means at a front wheel; a vehicle height determination means for comparing the vehicle height with a predetermined reference value; a cycle time determination means for detecting the cycle time of the vehicle height signal and for comparing the detected cycle time with a predetermined reference value; a control means for generating a suspension characteristic alteration signal based upon the vehicle height determination result and the cycle time determination result; and a suspension characteristic alteration means for altering a suspension characteristic of the vehicle in response to the suspension characteristic alteration signal.

4 Claims, 32 Drawing Figures

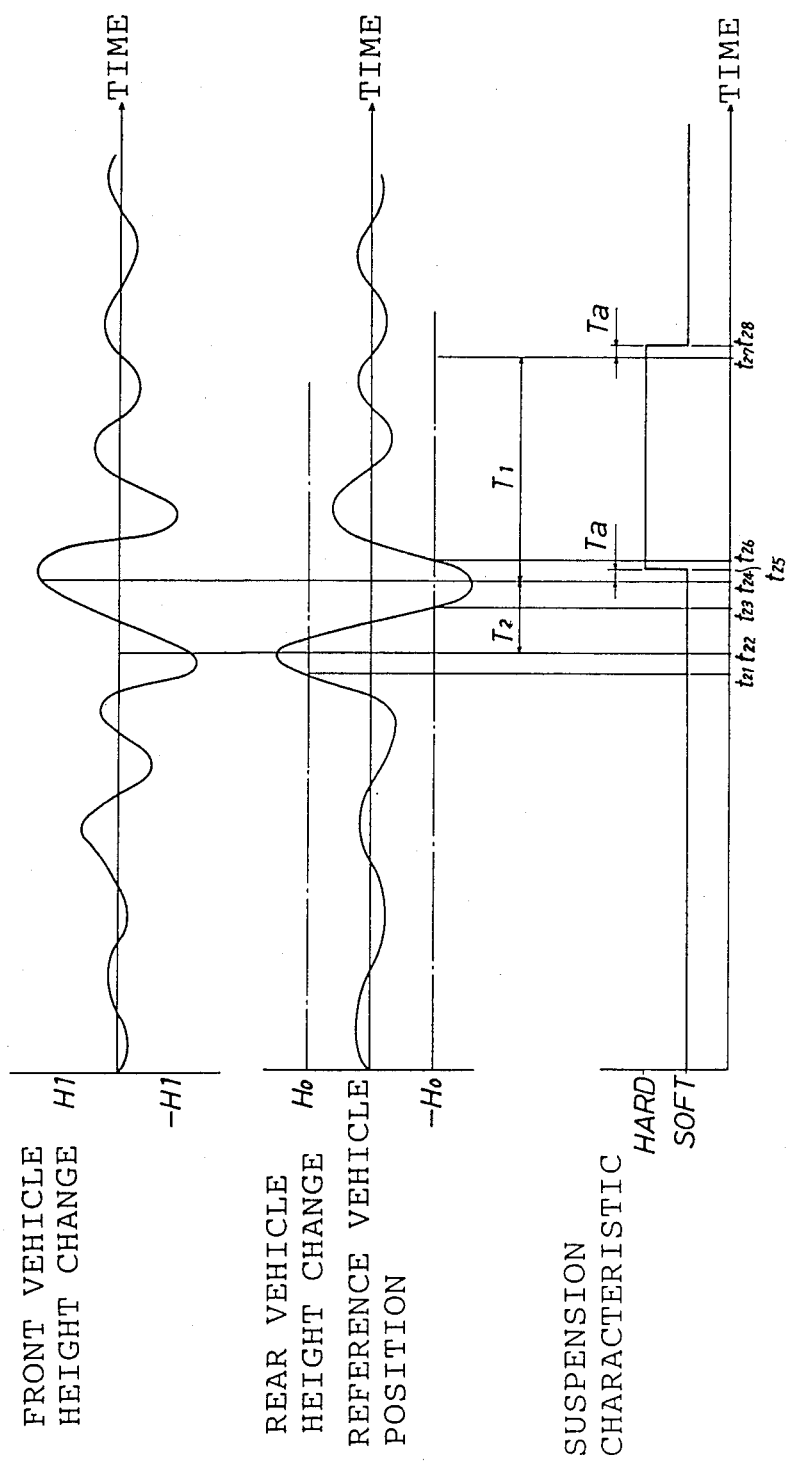

SUSPENSION CONTROLLER

BACKGROUND OF THE INVENTION

The present invention relates to a suspension controller for a vehicle, and more particularly relates to a suspension controller which is effective for absorbing a particular kind of vibration of unsprung mass including resonant vibration of the unsprung mass. Here, the unsprung mass means the mass of a wheel and the vibration of unsprung mass means the vibration of the wheel when the vehicle is lifted so that the wheel is not on the ground.

Characteristics of a suspension member installed between a wheel and a body, e.g., spring constant, damping force of a shock absorber, stiffness of a bush, etc., have been determined under various conditions examined in consideration of both improvement in riding comfort, and improvement in drivability and stability.

According to the experiment in the recent year, however, an invention has been proposed whose object is to provide a suspension controller which attains both good riding comfort and improvement in drivability and stability of the vehicle that are abmivalent to each other, by altering the suspension characteristic in response to the road conditions, and the running condition of the vehicle so as to evaluate good riding comfort under some conditions while evaluating improvement in drivability and stability of the vehicle under other conditions. Examples of such inventions are disclosed in "Variable Damping Force Shock Absorber" (Japanese Published Unexamined Patent Application No. Sho 58-30542) for realizing good running condition by increasing the damping force when the vehicle is heavily loaded or running on a rough road, and "Vehicle Height Adjusting Apparatus" (Japanese Published Unexamined Patent Application No. Sho 57-138406) for automatically adjusting vehicle height by raising the vehicle height against a rough road while lowering it for a flat road.

SUMMARY OF THE INVENTION

Objects of the present invention are as follows:

(1) Generally, vibrations occur having a cycle time close to that of the resonant vibration of unpsrung mass (frequency 10-15 Hz) when a vehicle continuously moves on a rough road such as an unpaved road or a paved road but having many rough patches, at a relatively high speed. Vibrations as mentioned above have a bad effect on road holding of the tires, then a side-skid of rear wheels can occur in turning, and drivability and stability of the vehicle is deteriorated. Such vibrations also have a bad effect on the passengers of the vehicle since the unpleasant up and down shocks are exerted thereto. The prior art has been so structured to alter the suspension characteristic solely on the basis of the amplitude of the vibration of the vehicle height. Accordingly, an object of the present invention is to detect quickly the vibration having a cycle time close to that of the resonant vibration of unsprung mass.

(2) Optimum suspension characteristic depends on whether the vibration has a cycle time close to that of the resonant vibration or not. In general, it is preferable to alter the suspension characteristic to the 'HARD' state when the vibration has a cycle time close to that of the resonant vibration of unsprung mass for improving the road holding of the tires, while it is preferable to alter the suspension characteristic to the 'SOFT' state for absorbing the shock vibrations having a cycle time other than the resonant vibration of unsprung mass. Another object of the present invention is to perform the proper suspension control on the basis of data concerning the cycle time of the exerted vibration, i.e., to alter the suspension characteristic in relation to the cycle time of the vibration.

(3) When the vehicle passes over a large bump or dip, when the vehicle cruises on an unpaved or uneven rough road, or when the vehicle moves on a road surface including a series of dips and bumps forming some wave shape, a vibration occurs whose vehicle height change is periodically repeated exceeding a predetermined range. The vibration generates two kinds of motion; a "bouncing" in which the front and the rear part of the vehicle move in the same direction, and a "pitching" in which the front and rear parts of the vehicle move in the opposite direction. As for the cycle time of vibration in such cases, the resonant vibration of unsprung mass whose cycle time is comparatively long (frequency of 1-2 Hz) and a resonant vibration of sprung mass whose cycle time is comparatively short (corresponding to frequency of 14-15 Hz) occurs, respectively. Still another object is to prevent the acceleration caused by the vibration when a displacement greater than the predetermined range is repeated at a predetermined cycle time. This vibration can be extremely unpleasant to passengers.

(4) A further object is to maintain road holding of the tires when the vibration noted in Paragraph (1) is generated, particularly when the displacement of unsprung mass becomes great to deteriorate efficiencies of turning, acceleration, and braking of the vehicle, thus lowering the stability of the vehicle in moving.

(5) A still further object is to prevent an inclination of the front part, namely, a "nose dive". It gives unpleasant shocks to the passengers and it may hurt the front part of the vehicle including the engine and other main parts, the bottom front part being scraped by the road surface.

(6) It is preferable for the moving vehicle to set the suspension characteristic to each corresponding condition not only in response to the amplitude of vibration, but also in response to the cycle time of vibration. The suspension controller according to the present invention, has an object that the suspension characteristic is set according to the cycle time, as well as the amplitude of the vehicle height vibration.

(7) Still another object is to provide a suspension controller capable of adequately absorbing the vibration caused by the displacement of the vehicle height change periodically repeated above a predetermined range.

The suspension controller according to the present invention includes:

a vehicle height detection means for detecting a vehicle height at a front wheel and for generating a vehicle height signal; a vehicle height determination means for receiving the vehicle height signal and comparing it with a predetermined reference value so as to generate a vehicle height determination signal in accordance with the result of the comparison;

a cycle time determination means for detecting the cycle time of the vehicle height signal indicative of the vibration of the vehicle and comparing the detected cycle time with a predetermined reference value so as to generate a cycle time determination signal;

a control means for receiving the vehicle height determination signal and the cycle time determination signal so as to generate a suspension characteristic alteration signal based upon the vehicle height determination signal and the cycle time determination signal; and a suspension characteristic alteration means for altering the suspension characteristic of the vehicle in response to the alteration signal.

The vehicle height detection means may well adopt a construction to convert the displacement of the suspension arm relative to the vehicle body given by a rotation angle of the arm into an angle signal detected by a potentiometer in the form of an analog signal. Moreover, it is available by another construction, in which a well-known rotary encoder detects the above-mentioned angle in the form of a digital signal.

The vehicle height determination means, for example, compares the amplitude of the vibration of the vehicle height signal or a displacement thereof from a reference vehicle height with a predetermined reference value and generates the vehicle height determination signal when the amplitude or the displacement exceeds the reference value.

The cycle time determination means first detects the cycle time of the vibration of the vehicle height signal. For example, the time interval from a maximum value of the vibration of the vehicle body to the minimum value thereof may be used to detect the cycle time. The cycle time determination means then determines, if the detected cycle time is in a predetermined range including a cycle time of a resonant vibration of unsprung mass and generates the cycle time determination signal in accordance with the result.

The control means generates the suspension characteristic alteration signal for altering the suspension characteristic to the harder state when the vehicle height determination signal which indicates that the amplitude of the vibration of the vehicle height signal is greater than the reference value, and the cycle time determination signal which indicates that the cycle time of the vibration of the vehicle height signal is within a cycle time of the resonant vibration of unsprung mass, are received.

The suspension characteristic alteration means may well be constructed to alter the spring constant, the damping force of a shock absorber, the stiffness of a bush, or the stiffness of a stabilizer discretely or continuously. In particular, it may be constructed to increase or decrease the spring constant by selectively communicating a main air chamber with a auxiliary air chamber, if the vehicle has an air suspension. The damping force may be increased or decreased by changing the size of an orifice which controls the oil flow of the shock absorber. Furthermore, it is possible to alter the bush stiffness or the stiffness of a stabilizer for altering the suspension characteristic, for example, to a hard state, namely, a 'HARD', to an intermediate state, namely, a 'SPORT', or to a soft state, namely a 'SOFT'.

The vehicle height determination means, and the cycle time determination means and control means may be logic circuits of discrete electronic elements, may be constructed as part of integrated logic circuits, including a CPU, a ROM, a RAM, and other peripheral circuitry chips.

BRIEF DESCRIPTION OF DRAWINGS

A preferred embodiment of the present invention will be disclosed hereinafter with reference to the appended drawings in which:

FIG. 12 shows timing charts of displacements of a front vehicle height, and a rear vehicle height, and change in rear suspension characteristic respectively varying in proportion to the elapsed time;

FIGS. 13–18 show other examples of units for altering the suspension characteristic;

FIG. 14 is a cross-sectional view of the second example;

A more complete appreciation of the invention and many of the attendant advantage thereof will be readily obtained as the same becomes better understood by reference to the following detailed description when considered in connection with the accompanied drawings.

DESCRIPTION OF THE PREFERRED EMBODIMENTS

Figure 1:
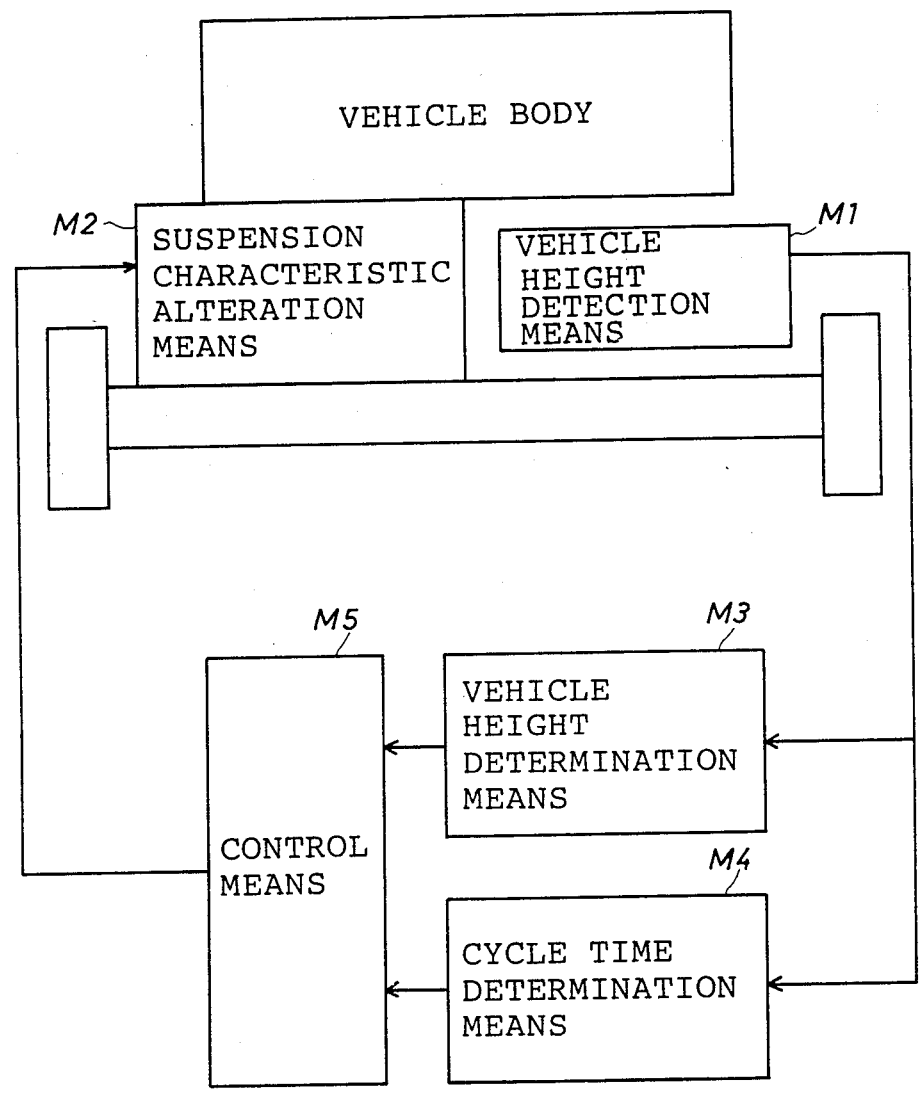
FIG. 1 is a schematic view showing a basic structure of the first embodiment according to the present invention.

The first embodiment according to the present invention is operated as shown in FIG. 1, in which: a vehicle height detection means M1 detects the vehicle height, a vehicle height determination means M3 determines if the vehicle height detected by the vehicle height detection means is greater than a predetermined range, a cycle time determination means determines if the cycle time of the vehicle height vibration is within a predetermined range including the resonant vibration of unsprung mass, and a control means M5 gives a command to the suspension characteristic alteration means M2 for altering the suspension characteristic to relatively hard state.

Accordingly, the suspension controller according to the first embodiment is effective to quickly absorb the vibrations which are greater than the predetermined range including a cycle time of a resonant vibration of unsprung mass. Hereinafter, preferred embodiments will be described in detail according to the drawings.

Figure 2:
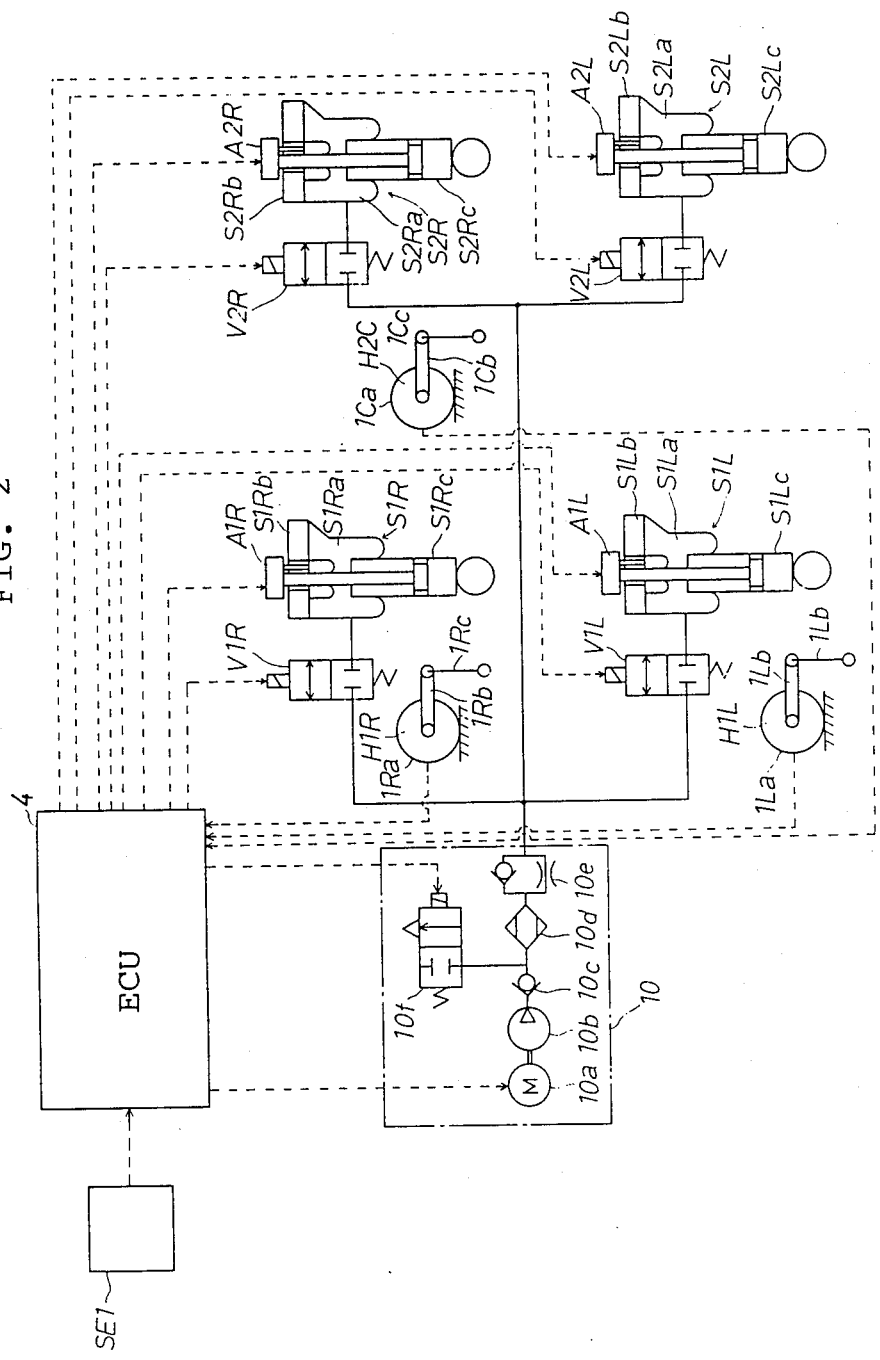
FIG. 2 is a systematic construction of a suspension controller according to the first embodiment of the present invention.

FIG. 2 shows details of a suspension controller for a vehicle, having air suspensions, according to one embodiment of the invention. A right front vehicle height sensor H1R is provided between a vehicle body and a right front wheel to detect the distance between the vehicle body and a right suspension arm which follows the motion of the wheel. A left front vehicle height sensor H1L is provided between the vehicle body and a left front wheel to detect the distance between the vehicle body and a left suspension arm. Short cylindrical bodies 1Ra and 1La of the vehicle height sensors H1R and H1L are secured on the vehicle body. Links 1Rb and 1Lb respectively extend substantially perpendicularly from each center shaft of the bodies 1Ra and 1La. Turnbuckles 1Rc and 1Lc are rotatably coupled to each one end of the links 1Rb and 1Lb opposite the bodies 1Ra and 1La respectively. The other ends of the turnbuckles 1Rc and 1Lc opposite the links are rotatably coupled to parts of the suspension arms.

The vehicle height sensors H1R and H1L are provided with a plurality of light interrupters for detecting the vehicle height displacement as 4-bit data by operating a disc so as to switch on and off the light interrupters in response to changes in the vehicle height, thus outputting a digital signal. The aforementioned disc is substantially coaxial with the center shaft of the vehicle height sensor and defines a slit thereon.

The following is an explanation of air suspension S1R, S1L, S2R and S2L. An air suspension S2L is provided between the left rear suspension arm and the vehicle body in parallel with a suspension spring (not shown). The air suspension S2L includes a main air chamber S2La functioning as an air spring, an auxiliary air chamber S2Lb, a shock absorber S2Lc, and an actuator A2L for altering the spring constant of the air spring and damping force of the shock absorber. Air suspensions S1R, S1L and S2R having the same construction and function as the air suspension S2L, are provided for the right front wheel, the left front wheel, and the right rear wheel, respectively.

A compressed air feed and discharge system 10 connected to each air spring of the air suspensions S1R, S1L, S2R and S2L operates a motor 10a to drive a compressor 10b for generating compressed air. The compressed air blows from the compressor 10b to an air drier 10d via a check valve 10c. The air drier 10d dries the compressed air supplied for the air suspensions S1R, S1L, S2R and S2L, and protects every part of the air suspensions S1R, S1L, S2R and S2L from moisture. The air drier 10d also prevents abnormal pressure changes which would accompany phase changes in main air chambers S1Ra, S1La, S2Ra and S2La and auxiliary air chambers S1Rb, S1Lb, S2Rb and S2Lb of the air suspensions. In a check valve 10e, the compressed air blows from the compressor 10b side to each of the air suspensions S1R, S1L, S2R and S2L side. The check valve 10e opens its checking portion in feeding the compressed air, and closes it in discharging the compressed air, thus discharging the compressed air only through the fixed portion thereof. A discharging valve 10f is an electromagnetic valve of 2-port 2-position spring off-set type. The discharging valve 10f is normally in the closed position as shown in FIG. 2. In discharging the compressed air from the air suspensions S1R, S1L, S2R and S2L, the valve 10f is open to discharge the compressed air to the atmosphere via the check valve 10e and the air drier 10d.

Air spring feed and discharge valves V1R, V1L, V2R and V2L function to adjust the vehicle height, and are provided between the air suspensions S1R, S1L, S2R and S2L, and the aforementioned compressed air feed and discharge system 10, respectively. The air spring feed and discharge valves V1R, V1L, V2R and V2L are electromagnetic valves of 2-port 2-position spring off-set type. These valves are normally in the closed positions shown in FIG. 2, and are open in adjusting the vehicle height. When the air spring feed and discharge valves V1R, V1L, V2R and V2L are open, the main air chambers S1Ra, S1La, S2Ra and S2La are connected with the compressed air feed and discharge system 10. If the compressed air is fed from the system 10, the volumes in the main air chambers S1Ra, S1La, S2Ra and S2La are increased so as to raise the vehicle height, and if the air is discharged because of the vehicle weight itself, the volumes thereof are decreased so as to lower the vehicle height. On the other hand, if the feed and discharge valves V1R, V1L, V2R and V2L are closed, the vehicle height remains unchanged. kAs described above, it is possible to change the volumes of the main air chambers S1Ra, S1La, S2Ra and S2La of the air suspensions so as to adjust the vehicle height by operating the discharge valve 10f and the air spring feed and discharge valves V1R, V1L, V2R and V2L.

A speed sensor SE1 is provided, for example, in a speedometer and outputs a pulse signal in response to the vehicle speed. The signals outputted from the vehicle height sensors H1R and H1L and the speed sensor SE1 are inputted to an Electronic Control Unit (ECU) 4. The ECU 4 derives data from the signals to process them and outputs a control signal to the actuators A1R, A1L, A2R and A2L of the air suspensions, to the air spring feed and discharge valves V1R, V1L, V2R and V2L, and to the motor 10a and the discharging valve 10f of the compressed air feed and discharge system 10 so as to optimally control them.

Figure 3:
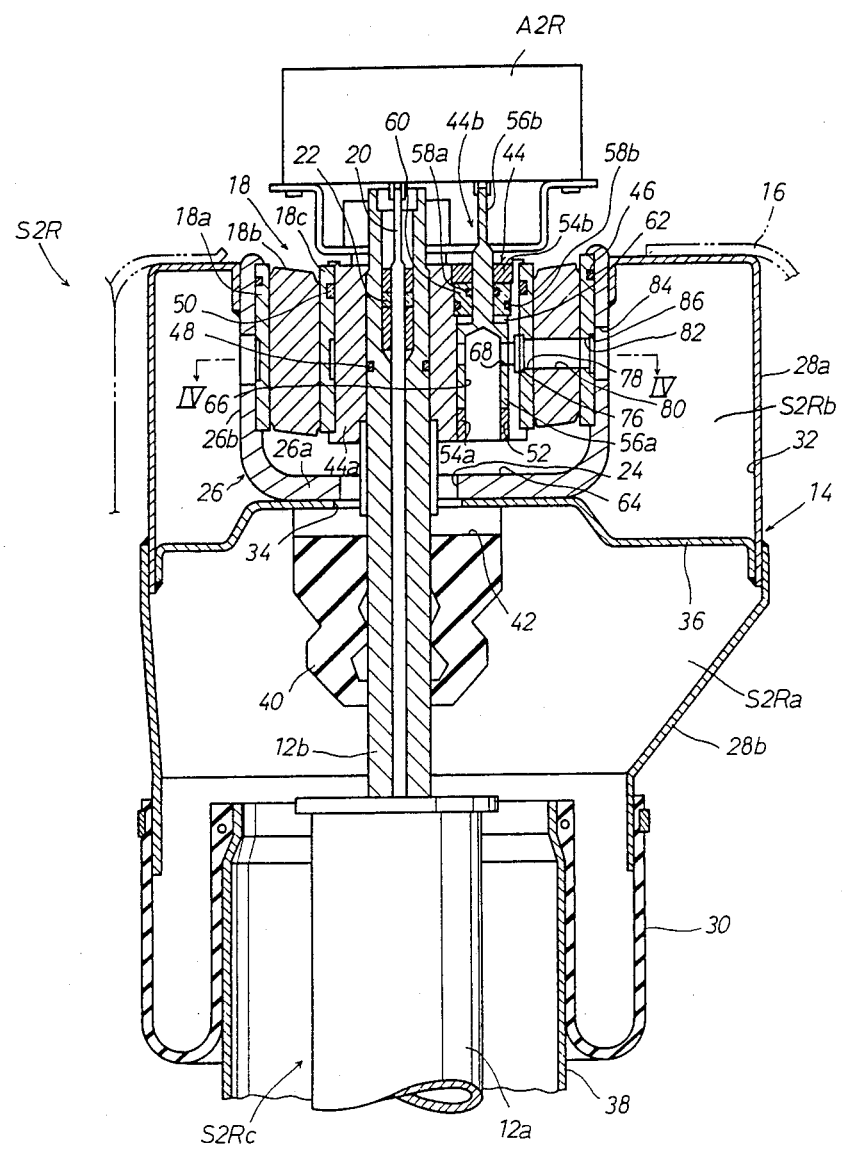
FIG. 3 is a cross-sectional view showing main parts of air suspension according to the first embodiment.
Figure 4:
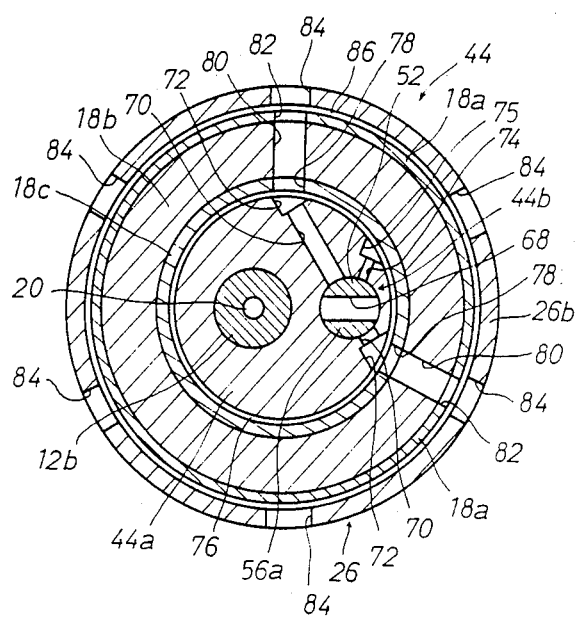
FIG. 4 is a cross-sectional view taken along line IV—IV of FIG. 3.

The following is an explanation of the main part of the air suspensions S1R, S1L, S2R and S2L with reference to FIGS. 3 and 4. Since each suspension has the similar system, only the right rear air suspension S2R will be described in detail.

The air suspension S2R includes a shock absorber S2Rc having a piston and a cylinder 12a, and an air spring unit 14 provided in connection with a shock absorber S2Rc, as shown in FIG. 3.

An axle (not shown) is supported at the lower end of the cylinder 12a of the shock absorber S2Rc. An elastic cylindrical assembly 18 for elastically supporting a piston rod 12b on the vehicle body 16 is provided at the upper end of the piston rod 12b extending from a piston (not shown) slidably fitted in the cylinder 12a. The damping force of the shock absorber S2Rc can be adjusted by operating on the valve function of the piston. A control rod 20 for controlling the damping force is sealed and rotatably fitted with a sealing member 22 in the piston rod 12b.

The air spring unit 14 has a chamber 32 which is defined by a circumferential member 26, an upper housing member 28a, a lower housing member 28b, and a diaphragm 30. The circumferential member 26 includes a bottom 26a having an opening 24, in which the piston rod 12b is inserted, and a wall 26b rising from the peripheral portion of the bottom 26a. The upper housing member 28a covers the circumferential member 26 and is secured on the vehicle body. The lower housing member 28b is open at the lower end and is coupled to the lower end of the upper housing member 28a. The diaphragm 30 includes an elastic material which closes the lower end of the lower housing member 28b. The chamber 32 is divided into a lower main air chamber S2Ra and an upper auxiliary air chamber S2Rb by a partition member 36, which is secured on the bottom 26a of the circumferential member 26 and which has an opening 34 corresponding to the opening 24 provided in the bottom 26a. Both the chambers S2Ra and S2Rb are filled with compressed air. The partition member 36 is provided with a buffer rubber 40 which can be brought into contact with the upper end of the cylinder 12a. The buffer rubber 40 has a passage 42 for connecting the openings 24 and 34 to the main air chamber S2Ra. The elastic cylindrical assembly 18 is disposed inside the circumferential member 26 whose wall 26b defines the inside circumferential surface of the auxiliary air chamber S2Rb, in such a manner that the assembly 18 surrounds the piston rod 12b.

The cylindrical elastic assembly 18 is provided with a valve unit 44 for controlling the connection of both the air chambers S2Ra and S2Rb. The assembly 18 includes an outer cylinder 18a, a cylindrical elastic member 18b and an inner cylinder 18c which are disposed concentrically to each other. The cylindrical elastic member 18b is secured to both the cylinders 18a and 18c. The outer cylinder 18a is press-fitted on the wall 26b of the circumferential member 26 secured on the vehicle body by means of the upper housing member 28a. A valve casing 44a of the valve unit 44, in which the piston rod 12b is inserted, is secured on the inner cylinder 18c. Since the piston rod 12b is secured on the valve casing 44a, the piston rod is elastically connected to the vehicle body by means of the cylindrical elastic assembly 18. An annular air sealing member 46 is tightly packed in between the outer cylinder 18a and the wall 26b of the member 26. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 which is open at both its ends and which extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operation portion 56b projecting from the main portion above the elastic cylindrical assembly 18. An upper positioning ring 54b is provided at the upper end of the hole 52 and cooperates with the lower positioning ring 54a to prevent the valve 44b from dropping out of the hole 52. An annular sealing base 60, holding an inner air sealing member 58a and an outer air sealing member 58b for tightly closing the hole 52, is provided between the upper positioning ring 54b and the main portion 56a of the valve 44b. A friction reducer 62 for smoothing the revolution of the valve 44b, when the main portion 56a of the valve is pushed to the sealing base 60 by air pressure, is provided between the sealing base 66 and the main portion 56a of the valve 44b.

A chamber 64 is formed in the lower portion of the elastic cylindrical assembly 18 and is connected with the main air chamber S2Ra by means of the openings 24 and 34 and the passage 42 of the buffer rubber 40. The main portion 56a of the valve 44b has a recess 66 open to the chamber 64, and has a connection passage 68 extending through the main portion 56a in a diametrical direction thereof across the recess 66.

The valve casing 56b, which houses the valve 56a, has a pair of air passages 70, each of which can connect at one end with the connection passage 68, as shown in FIG. 4. The air passages 70 extend outwards in a diametrical direction of the hole 52 toward the peripheral surface of the valve 44b. The other end of each air passage 70 is open to the peripheral surface of the valve casing 44a through a face hole 72. An air passage 74, which can connect at one end with the connection passage 68 of the hole 52, extends toward the peripheral surface of the valve casing 44a on the substantially same plane as the pair of air passages 70 and between them. The diameter of the air passage 74 is smaller than that of each of the air passages 70. The other end of the air passage 74 is open to the peripheral surface of the valve casing 44a through a face hole 75. The inside circumferential surface of the inner cylinder 18c, covering the peripheral surface of the valve casing 44a, has an annular recess 76 which surrounds the peripheral surface of the valve casing 44a in order to connect the face holes 72 and 75 of the air passages 70 and 74 to each other.

The inner cylinder 18c has openings 78 which are open to the recess 76 which constitutes an annular air passage. The cylindrical elastic member 18b has radially extended through holes 80, corresponding to the openings 78. The through holes 80 are open to the peripheral surface of the outer cylinder 18a through openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a is provided with plural openings 84, which are located at equal intervals in the circumferential direction of the member 26 and which are open to the auxiliary air chamber S2Rb so as to connect the openings 78 and 82 and the through holes 80 with the auxiliary air chamber S2Rb. The peripheral surface of the outer cylinder 18a is provided with an annular recess 86, which surrounds the outer cylinder at the openings 82, so as to connect the openings 84, 78 and 82 and through holes 80 to each other. The openings 84 are open to the recess 86 constituting an annular air passage.

In the embodiment shown in FIG. 4, the positions of the openings 78 and 82 and the through holes 80 are defined by the positions of the two air passages 70 of the valve casing 44a. The air passages 70 and 74 can be optionally provided in positions in the circumferential direction of the elastic member 18b since the annular recess 76, with which the air passages 70 and 74 are connected, is formed between the inner cylinder 18c and the valve casing 44a.

A control rod 20 for controlling the damping force of the shock absorber S2Rc, and an actuator A2R for rotating the rotary valve 44b of the valve unit 44, are provided at the upper end of the piston rod 12b, as shown FIG. 3.

The air suspension S2R having the above-mentioned construction, operates in the following manner.

When the valve 44b is kept in a closed position as shown in FIG. 4 so that the connection passage 68 of the valve disconnects from any of the air passages 70 and 74 of the valve casing 44a, the main air chamber S2Ra and the auxiliary air chamber S2Rb are disconnected from each other, thus the spring constant of the suspension S2R is set at a large value.

When the actuator A2R rotates the valve 44b into a position wherein the connection passage 68 of the valve connects with the large-diameter air passages 70 of the valve casing 44a, the main air chamber S2Ra is connected with the auxiliary air chamber S2Rb through the connection passage 68, the large-diameter air passages 70, the openings 78 and 82 and the through holes 80 and the openings 84, thus the spring constant of the suspension S2R is set at a small value.

When the valve 44b is rotated by the actuator A2R into a position wherein the connection passage 68 of the valve connects with the small-diameter air passage 74 of the valve casing 44a, the main air chamber S2Ra is connected with the auxiliary air chamber S2Rb through the connection passage 68, the small-diameter air passage 74, the annular recess 76, the openings 78 and 82 and the through holes 80 and the openings 84, thus the spring constant of the suspension S2R is set at an intermediate value. This is because the small-diameter air passage 74 provides a higher air flow resistance than the large-diameter air passages 70.

Figure 5:
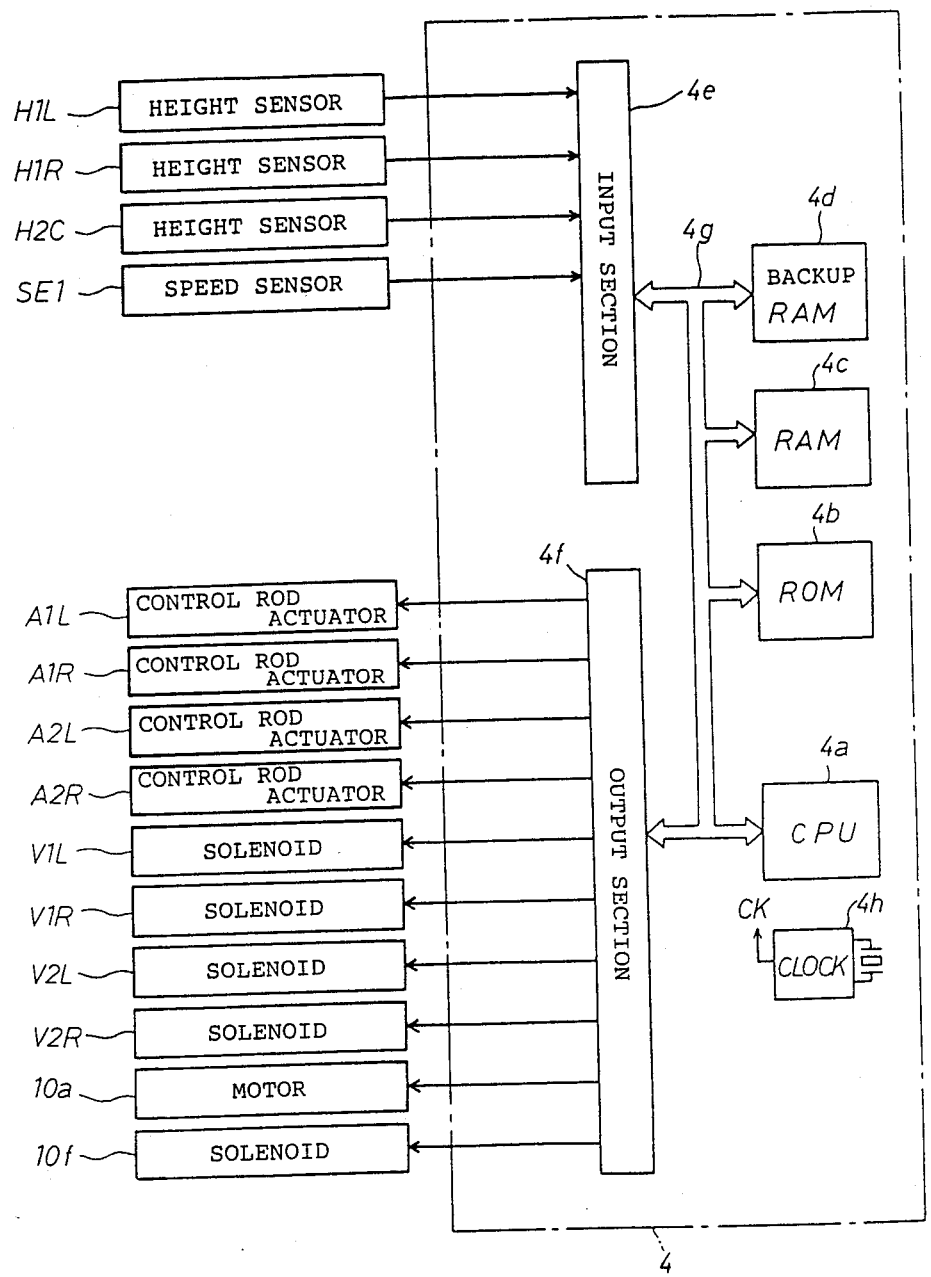
FIG. 5 is an explanatory block diagram showing the structure of an electronic control unit (ECU)

FIG. 5 shows the construction of the ECU 4. The ECU 4 includes a Central Procession Unit (CPU) 4a, a Read Only Memory (ROM) 4b, a Random Access Memory (RAM) 4c, a back-up Random Access Memory (back-up RAM) 4d, an input section 4e, an output section 4f, a bus line 4g and a clock circuit 4h. The CPU 4a receives output data from the sensors to process them according to a control program for controlling various apparatuses, means or the like. In the ROM 4b, the control program and initial data are stored. The RAM 4c functions to write and reat out data, which the ECU 4 receives for the control. The backup RAM 4d is backed up by a battery so as to retain data even if the ignition key switch of the automobile is turned off. The input section 4e includes an input port (not shown), a waveshaping circuit (as occasion demands), a multiplexer which selectively sends out output signals from the sensors to the CPU 4a, and an A/D converter which converts an analog signal into a digital signal. The output section 4f includes an output port (not shown), and a drive circuit for driving the actuators according to the control signal of the CPU 4a as occasion demands. The bus line 4g connects the element, such as the CPU 4a, the ROM 4b, and the input and the output sections 4e and 4f, with each other so as to transmit data from each element. The clock circuit 4h sends out a clock signal for informing the control timing at predetermined time intervals to the CPU 4a, the ROM 4b, the RAM 4c, etc.

Figure 6:
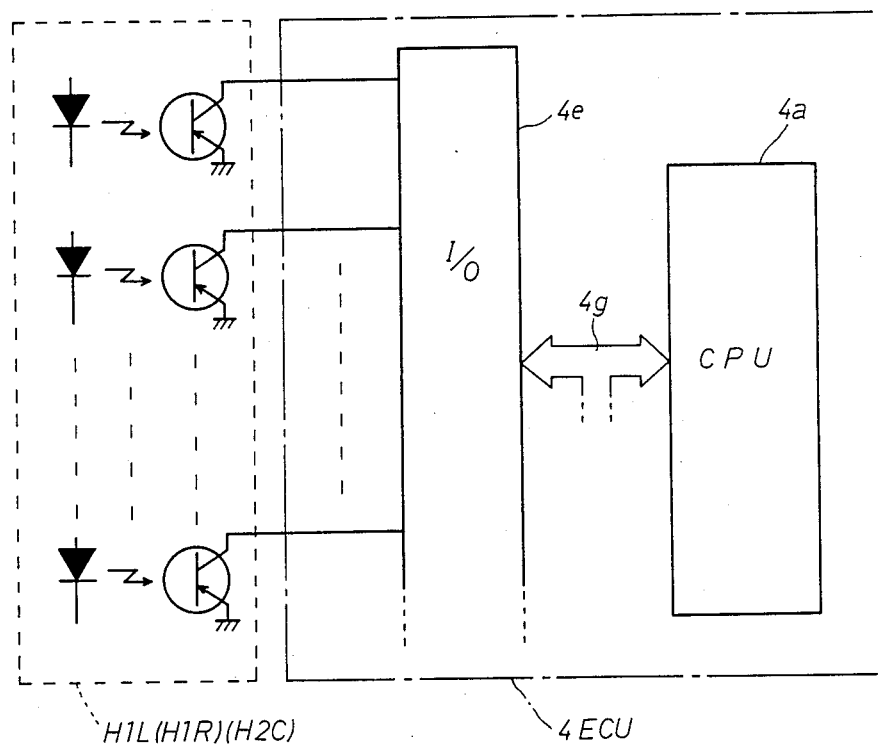
FIG. 6 is a block diagram showing a digital signal input section of the ECU of FIG. 5 and a corresponding vehicle height sensor.
Figure 7:
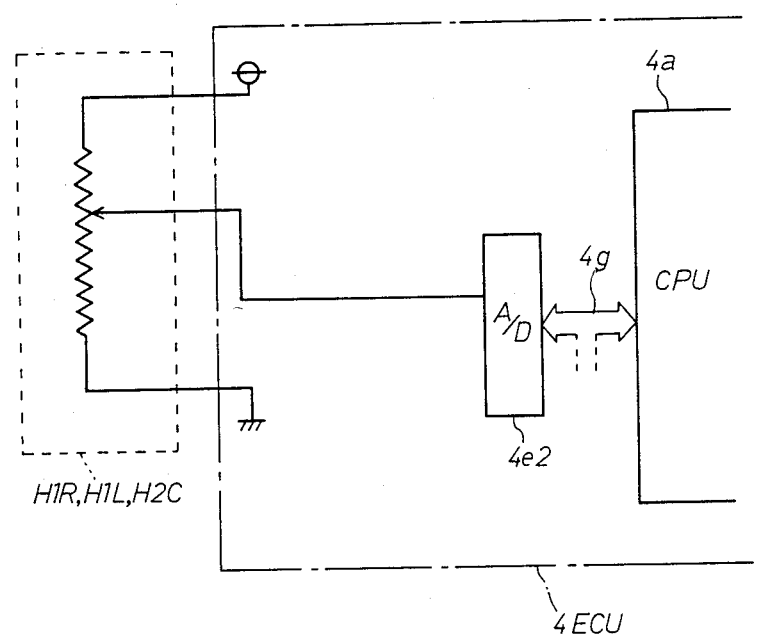
FIG. 7 is a block diagram showing an analog signal input section of ECU of FIG. 5 and a corresponding vehicle height sensor.

If the signals outputted from the vehicle height sensors H1R and H1L are 4-bit digital signals, they are transmitted to the CPU 4a via the input section 4e as shown in FIG. 6. On the contrary, if being analog signals, they are converted into digital ones and are then transmitted to the CPU 4a as shown in FIG. 7.

Processing steps which are performed by the ECU 4 are hereinafter explained on the basis of the flowchart shown in FIGS. 8A and 8B. The processing steps for the suspension control according to this embodiment are initiated and repeatedly executed so long as the vehicle is in the cruising condition (the speed of which ranges 30–80 km/h) and 'AUTO' mode is selected by a driver. The processing steps of the present suspension control are regularly interrupted by the vehicle height detection processing steps (not shown) that are initiated by a soft timer. As a result of these vehicle height detection processing steps, the vehicle heights is successively detected by the left and right front vehicle height sensors H1L and H1R, and the rear vehicle height sensor H2c, every predetermined time interval (for example, 8 msec. in the embodiment). The front vehicle height data HF and the rear vehicle height data HR are converted into displacements from the reference vehicle height and successively replaced by new data. Therefore, the updated vehicle height data and the previous vehicle height data are respectively stored in predetermined locations in RAM 4c. The suspension control processing steps according to the first embodiment are executed in the manner described above. The following is an outline of the control processing steps executed in the present embodiment.

(1) It is determined (step 100) if the updated rear vehicle height data HR (here it is a displacement of the vehicle height change from a standard vehicle position) is greater than a reference value H0.

(2) It is determined (step 105) if the rear wheel is in the condition "caught in" a dip, namely, "rebounded" state or "hitting" a bump, namely, "bounded" state, when the rear vehicle height data HR is not less than H0.

(3) The semi-cycle time of the vibration is counted after the front vehicle height data HF is confirmed to be greater than a reference value H1, if the result of the decision in Paragraph (2) is that the vehicle is rebounded. The suspension characteristic is altered to the 'HARD' state if the semi-cycle time is greater than the minimum semi-cycle time TC for judging the resonant vibration of unsprung mass and less than than a maximum semi-cycle time TD for judging the resonant vibration of unpsrung mass (steps 110, 115, 125, 130, 140, 155, 160, and 165).

(4) On the other hand, if the result of the decision in the Paragraph (2) is that the rear wheel is in the condition of "hitting" a bump, the semi-cycle time of the vibration is counted after the front vehicle height data HF is confirmed to be greater than the reference value H1, in the manner described in the paragraph (3). The suspension characteristic is altered to the 'HARD' state if the semi-cycle time of the vibration is greater than the minimum semi-cycle time TC for judging the resonant vibration of unsprung mass and is less than the maximum semi-cycle time TD for judging the resonant vibration of unsprung mass (steps 310, 315, 325, 330, 340, 355, 360, and 365.

(5) In the conditions noted in the Paragraph (3) or (4), time counting is started after the suspension characteristic is altered to the 'HARD' state. The suspension characteristic is again altered (steps 170, 370, 100, 400, and 405) to the 'SOFT' state, if the vehicle height data HR is not greater than the reference value H0 before returning time interval TA has elapsed.

Details of the processing steps of the rear suspension controller according to the present embodiment are explained hereinunder.

Figure 8A:
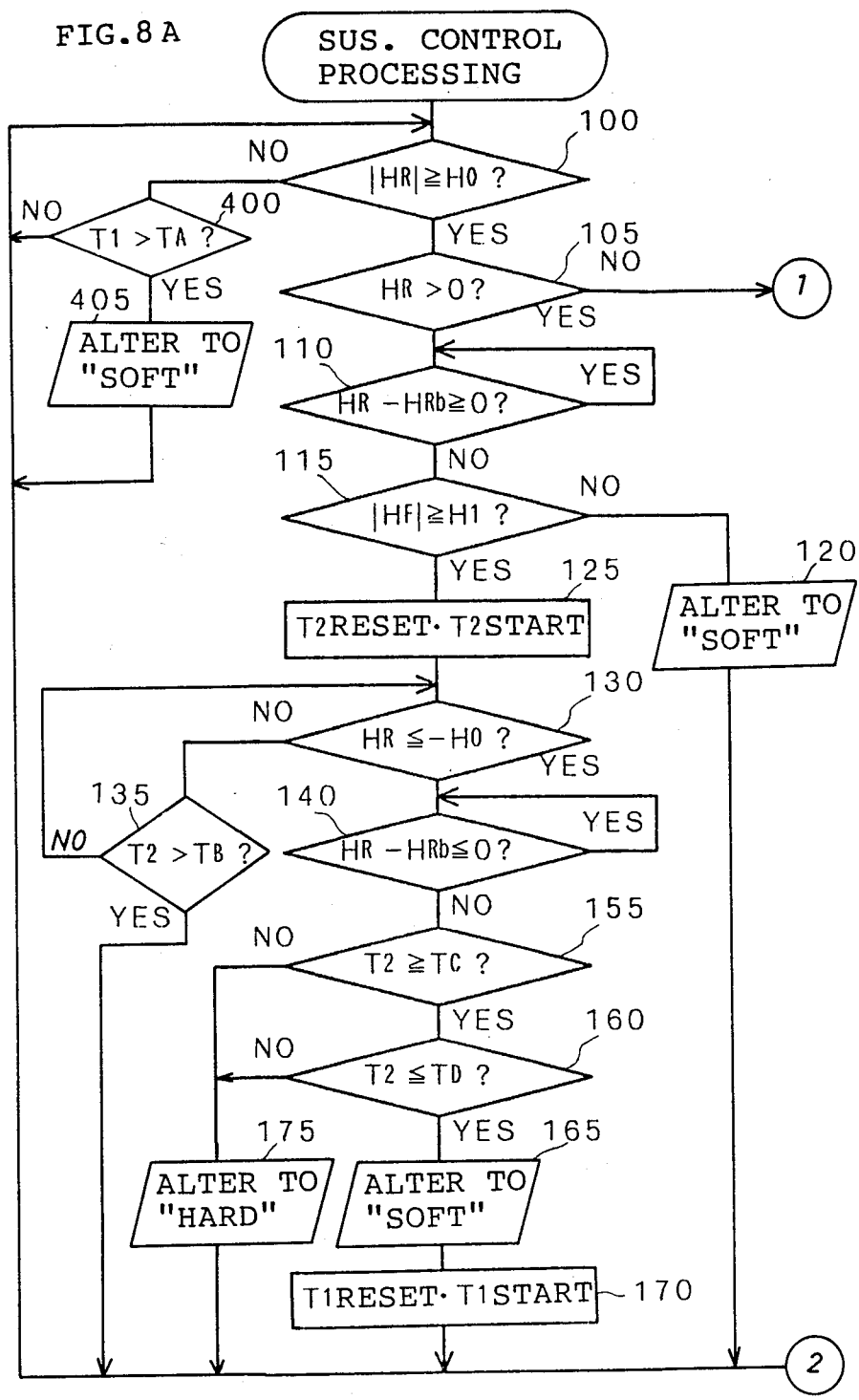
FIG. 8A and FIG. 8B are flowcharts of a processing executed by the ECU according to the first embodiment.
Figure 8:
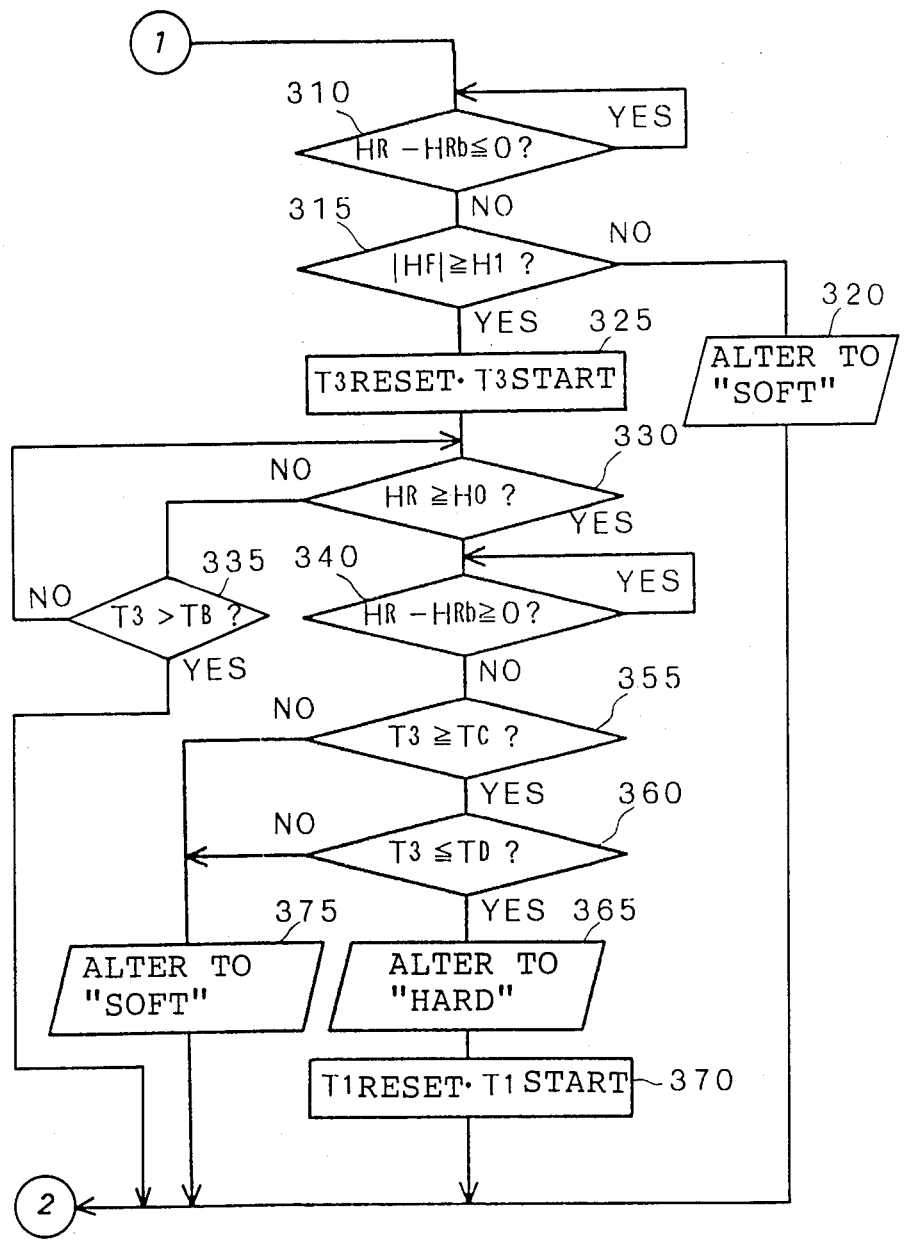

First, it is determined if the absolute value of the rear vehicle height data HR is not less than the reference value H0 at step 100 of FIG. 8A. Here, the front vehicle height data HR is a displacement from the standard vehicle position updated every predetermined time interval. The value of the vehicle height HR may be negative or positive. If the rear wheel gets onto a bump or is caught in a dip, the degrees of which are greater than a predetermined range, the absolute value of the rear vehicle height data HR is not less than the reference value H0, and the processing step is advanced to step 105.

At step 105, it is determined if the value of the rear vehicle height data HR is positive or negative. When the rear wheel is caught in a dip on the road surface, the distance between the wheel and the vehicle body is made substantially larger to become greater than that of the standard vahicle position. Therefore, the rear vehicle height data HR representing a displacement from the standard vehicle height takes a positive value. On the contrary, when the rear wheel hits a bump of the road surface, the distance between the wheel and the vehicle body is made substantially smaller to become less than that of the standard vehicle position. Therefore, the rear vehicle height data HR takes a negative value. If the rear wheel is determined to be "caught in" a dip, the processing step is advanced to step 110 of FIG. 8A, while the processing step is advanced to step 310 of FIG. 8B if the rear wheel is determined to be "hitting" a bump, however, the subsequent steps are the same in either case. Therefore, explanation is continued on the assumption that rear wheel is found to be "caught in" a dip.

At step 110, it is determined if the updated rear vehicle height data HR is greater than and equal to the rear vehicle height data HRb previousiy detected one time before. Consecutive execution of processing at step 110 leads to the detection of the time point at which the updated vehicle height data HR becomes less than the previous vehicle height data HRb. It enables detection of the time point at which the updated rear vehicle height data HR becomes a maximum value. The processing at step 110 is repeatedly executed until the maximum value of the updated rear vehicle height data HR is detected. When the maximum value of the updated rear vehicle height data HR is detected, the processing step is advanced to step 115. At step 115, it is determined if the absolute value of the updated front vehicle height data HR is greater than or equal to a reference value H1. Generally, the front vehicle height data HF shows little change if the rear vehicle height change is caused by a sporadic dip or bump on the road surface affecting a temporary shock to the vehicle. On the contrary, if the rear vehicle height change is caused because the vehicle moves on a continuous rough road, the front vehicle height data HF shows large change. Accordingly, the processing at step 115 makes it possible to determine whether the vehicle receives a sporadic shock or continuous vibration. If it is determined that a sporadic shock is exerted, the processing step is advanced to step 120 for executing the processing steps to alter the suspension characteristic to the 'SOFT' state. Specifically, the processing steps for altering the suspension characteristic to the 'SOFT' state are such as to lower the spring constant of the air spring by way of activating the actuators A1R, A1L, A2R, and A2L for communicating the main air chambers S1Ra, S1La, S2Ra and S2La with the auxiliary air chambers S1Rb, S1Lb, S2Rb and S2Lb via the large section air passage 70 in the air suspensions S1R, S1L, S2R, and S2l respectively, and to rotate each control rod 20 of the shock absorbers S1Rc, S1Lc, S2Rc, and S2Lc so as to decrease damping force. After that, the processing step returns to step 100.

If it is determined that a continuous shock is exerted, the processing step is advanced to step 125. At step 125, the processing step is executed for resetting the timer T2 to count the "getting onto" time interval. The timer T2 is started to count a "hitting" time interval from a time point at which the updated rear vehicle height data HR detected at step 110 becomes a maximum value. At a subsequent step 130, it is determined if the updated rear vehicle height date HR is not more than −H0. Namely, it is determined if the updated rear vehicle height data HR is decreased from the standard vehicle height by more than the reference value H0. Execution of the determination at step 130 is made for detecting the movement of the rear wheel, because, if the vehicle vibration is exerted by continuous shocks, the rear wheel caught in the dip at step 110 should hit a succeeding bump. If the vehicle height data is determined to be greater than −H0, the processing step is advanced to step 135. At this step, it is determined if the counted value in the timer T2 representing the "hitting" time interval is greater than a reference detection time interval TB. If it is determined that the reference detection time interval TB has not yet elapsed, the processing step returns to step 130 for repeatedly executing the detection of the the rear wheel in the condition of "hitting" a bump. On the other hand, when the reference time interval TB has elapsed without the rear wheel "hitting" a bump whose value is greater than the reference value H0, it is determined that the vibration detected at step 100 is sporadic, not continuous, and the processing step returns to step 100. The description hereinunder is continued on the assumption that the condition "hitting" a bump of the rear wheel is detected within the time interval TB at step 130. Here, the processing step is advanced to step 140 for determining if the updated rear vehicle height data HR is less than or equal to the previous rear vehicle height data HRb. The processing step executed at this step is for detecting a time point at which the rear vehicle height data HR becomes minimum in the same manner as executed previously at step 110. This processing step is repeatedly executed until the minimum value of the updated rear vehicle height data HR is detected, i.e., the subsequent processing step is delayed until the detection of the minimum value. If the minimum value as explained above is detected, the processing step is advanced to step 155. At step 155, it is determined if the value counted by the timer T2 is greater than or equal to a minimum semi-cycle time TC for judging the resonant vibration of unsprung mass. In particular, it is determined if the currently detected vibration has a cycle time within a predetermined cycle range, since the timer T2 counts up the time interval from the time point at which the rear vehicle height becomes maximum at step 110 to a time point when the rear vehicle height becomes minimum at step 140 (the riding up time interval corresponds to the semi-cycle time at the detected vibration).

The minimum semi-cycle time TC for judging the resonant vibration of unsprurg mass corresponding to a frequency of about 15 Hz, and is preset at about 0.035 sec. in the present embodiment. If the value in the timer T2 is determined to be greater than or equal to the minimum semi-cycle time TC for judging the resonant vibration of unsprung mass, the processing step is advanced to step 160. At step 160, it is determined if the value in the timer T2 is less than or equal to the maximum semi-cycle time TD for judging the resonant vibration of unsprung mass. Namely, it is determined if the currently detected vibration has a cycle time in the predetermined range. The maximum semi-cycle time TD corresponds to a frequency of about 10 Hz, and is preset at 0.05 sec. in the first embodiment. If the counted value in the timer T2 is less than or equal to the maximum semi-cycle time TD, the processing step is advanced to step 165.

The processing step at step 165 is executed in response to the determination that the vibration is the resonant vibration of unsprung mass, and the executed processing step is for altering the suspension characteristic to the 'HARD' state. Specifically, the processing step for altering the suspension characteristic to the 'HARD' state is such as to increase the spring constant of the air spring by way of activating the actuators A1R, A2R, and A2L for discommunicating the main air chambers S1Ra, S1La, S2Ra, and S2La from the auxiliary air chambers S1Rb, S1Lb, S2Rb, and S2Lb in the air suspensions S1R, S1L, S2R and S2L respectively, and to rotate each control rod 20 of the shock absorbers S2Rc, S1Lc, S2Rc, and S2Lc so as to increases the damping force. At subsequent step 170, the processing step for resetting and starting the timer T1 for counting a returning time interval is executed, and the processing step returns to step 100.

At step 155 or 160, however, if it is determined that the current vibration is not the resonant vibration of unsprung mass, having a cycle time greater or less than that of the resonant vibration of unsprung mass, the processing step is advanced to step 175. At step 175, processing steps for altering the suspension characteristic to the 'SOFT' state are executed, and the processing step returns to step 100.

The following is a description of the processing step executed when the decision is made that the rear wheel is in the condition "hitting" a bump as previously mentioned at step 105. The processing steps of FIG. 8B executed in such case are similar to those executed in the above-mentioned steps 105-175 of FIG. 8A, the same processing steps as those described previously are numbered with last two digits the same as those of the corresponding step so as to omit the explanation. At first, the minimum value of the updated rear vehicle height data HR is detected (step 310) as shown in FIG. 8B, and then the vibration of the vehicle is determined (step 315) to be either sporadic vibration or continuous vibration. If the decision is made that the current vibration is sporadic, the processing step for altering the suspension characteristic to the 'SOFT' state is executed and then the processing step returns (step 320) to step 100. On the other hand, if the current vibration is determined to be continuous, a timer T3 is started (step 325) to count a "caught in" time interval and detect (steps 330, 335) the movement of the rear wheel shifted in the condition of "caught in" the dip in proportion to the elapsed time interval. If the the condition of "caught in" the dip is not detected within a reference detection time interval TB, the processing step returns to step 100.

When it is detected that the rear wheel is in the condition of "caught in" the dip, the maximum value of the updated rear vehicle height data is detected (step 340), and it is determined (steps 355, 360) if the counted value in the timer T3 is in the range greater than or equal to the minimum semi-cycle time TC and less than or equal to the maximum semi-cycle time TD for judging the resonant vibration of unpsrung mass. If the vibration is determined as resonant vibration of the unsprung mass having a cycle time within the predetermined cycle range, the suspension characteristic is altered to the 'HARD' state and the timer T1 is started for counting returning time interval (steps 365, 370). Thereafter, processing step returns to step 100. On the other hand, if the vibration is not determined to have a cycle time within the predetermined range, the suspension characteristic is altered to the 'SOFT' state (step 375), and the processing step returns to step 100.

When the processing step returns again to step 100 after altering the suspension characteristic to the 'HARD' state at step 165 or 365 and the updated rear vehicle height data HR is less than the reference value H0, i.e., when the vibration of the vehicle is damped by the alteration of the suspension characteristic, the processing step is advanced to step 400. At step 400, it is determined if the value counted in the timer at step 170 or 370 as mentioned before is greater than a reference time interval TA for returning the suspension characteristic. If the returning time interval TA has not elapsed, the processing step returns to step 100. If the updated rear vehicle height date HR does not exceed the reference value H0 and the reference time interval TA has elapsed, it is determined that the vibration is damped thoroughly because of the alteration of the suspension characteristic to the 'HARD' state, and the processing step is advanced to step 405. At step 405, the processing for altering the suspension characteristic to the 'SOFT' state is executed, and the processing step returns to step 100. The routine is repeatedly executed only when the vehicle is in the cruising condition and 'AUTO' mode is selected by the driver.

Figure 9:
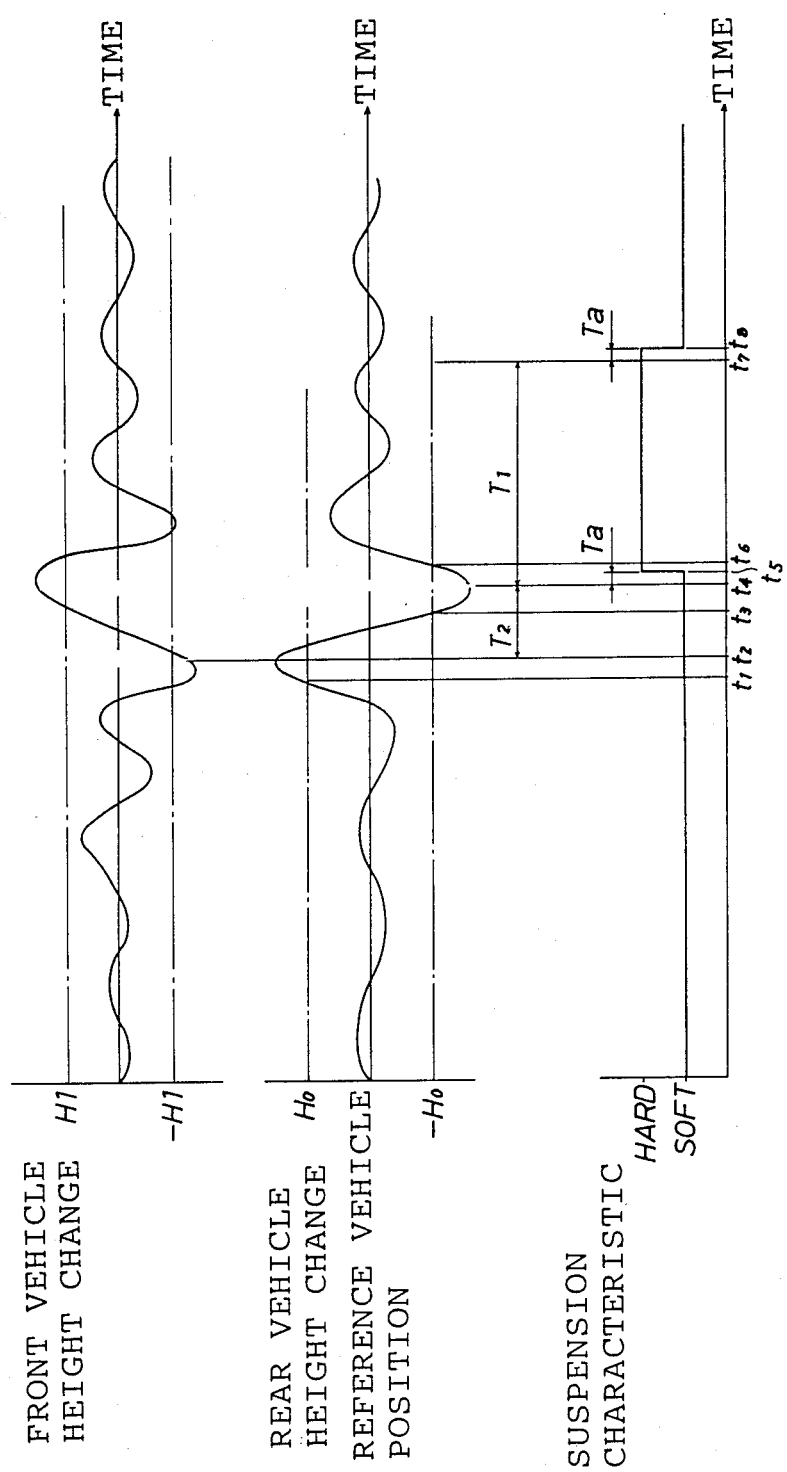
FIG. 9 shows timing charts of displacement of front vehicle height and a rear vehicle height, and change in rear suspension characteristic respectively varying in proportion to the elapsed time.

An example of the control timing for the above-mentioned suspension control is explained hereinunder on the basis of the timing chart shown in FIG. 9.

A time point t1 indicates when the rear wheel begins to be caught in a dip of the road surface and the rear vehicle height data HR is greater than the reference value H0. From the time point t1, the maximum value of the rear vehicle height data HR begins to be detected. A time point t2 indicates when the maximum value of the rear vehicle height data HR is detected. Accordingly, the timer T2 begins to count the "hitting" time interval at the time point t2. Furthermore, the time point t2 also indicates when the absolute value of the front vehicle height data HF is greater than the reference value H1, thus indicating the continuously vibrated condition.

From the time point t2, it is initiated to detect that the rear wheel is "hitting" a bump due to the reaction of the "caught into" the dip. The value of the rear vehicle height data HR is decreased to become lower than the standard vehicle height by the reference value H0 at a time point t3. From the time piont t3, the detection of the minimum value of the rear vehicle height data HR is begun, and the minimum value is detected at a time point t4. The timer T2 for counting the "hitting" time interval counts the time interval from the time point t2 at which the maximum value of the rear vehicle height data HR is detected to the time point t4 at which the minimum value of the rear vehicle height data is detected, and it is determined that the vibration exerted to the vehicle body has a frequency of resonant vibration of unsprung mass ranging in 10–15 Hz if the counted value is determined in the range greater than the minimum semi-cycle time TC and less than the maximum semi-cycle time TD for judging the resonant vibration. At the time point t4, the processing step for altering the suspension characteristic from the 'SOFT' to the 'HARD' state is begun, and the suspension characteristic is altered to the 'HARD' state at a time point t5. The timer T1 is also initiated to count the returning time interval.

After the time point t4, the rear vehicle height data HR begins to approach the standard vehicle height, and the absolute value of the rear vehicle height data HR becomes less than the reference value H0 at a time point t6. Since the suspension characteristic has been already altered to the 'HARD' state at the time point t5, the resonant vibration of unsprung mass is calmed down rapidly and the absolute value of the rear vehicle height data HR falls down below the reference value H0. At a time point t7, it is determined that the resonant vibration of unsprung mass is calmed down for starting to alter the suspension characteristic from the 'HARD' state to the 'SOFT' state so as to alter the suspension characteristic to the 'SOFT' state at a time point t8, after the actuator driving time interval Ta from the time point t7. Hereafter, measurement of the semi-cycle time of the change in the rear vehicle height data HR is performed in the same manner as described above when the absolute value of the rear vehicle height data HR is determined to be greater than the reference value H0 and the vibration of the vehicle is continuous, while performing the processing step for altering the rear suspension characteristic to the 'HARD' state when the semi-cycle time is determined to be greater than the minimum semi-cycle time TC and less than the maximum semi-cycle time TD for judging the resonant vibration. In addition, when the absolute value of the rear vehicle height data HR is determined to be greater than the reference value H0 and the vibration to the vehicle is sporadic, the processing for altering the suspension characteristic to the 'SOFT' state is executed, though the processing step is not shown in the drawing.

The front vehicle height sensors H1L and H1R, the rear vehicle height sensor H2C and ECU 4 of the first embodiment integrally function as the vehicle height detection means M1, and the suspensions S1L, S1R, S2L, and S2R and the suspension characteristic alteration actuators A1L, A1R, A2L and A2R of the present embodiment integrally function as the rear suspension characteristic alteration means M2. The ECU 4 and the processing steps (steps 100, 115, 315) executed by the ECU 4 integrally function as the vehicle height determination means M3, the ECU 4 and the processing steps (steps 125, 155, 160, 325, 355, and 360) executed by the ECU 4 integrally function as the cycle time determination means M4, and the ECU 4 and the processing steps (steps 165, 365) executed by the ECU integrally function as the control means M5.

As described in detail above, the first embodiment operates to detect vehicle height data HR greater than the reference value H0 for determining if the exerted vibration is sporadic or continuous. The first embodiment operated as such alters the suspension characteristic to the 'SOFT' state against sporadic vibration, while altering the suspension characteristic to the 'HARD' state against continuous vibration having a semi-cycle time greater than the minimum semi-cycle time TC and less than the maximum semi-cycle time TD for judging the resonant vibraton of unsprung mass.

Accordingly, one advantage of the first embodiment operated as such is to detect the resonant vibration of unsprung mass having a particular cycle time (corresponding to the frequency of 10–15 Hz) rapidly and surely so as to calm down the resonant vibration of unsprung mass, thus improving road holding of the tires leading to the enhanced drivability and stability of the vehicle. Moreover, the rear wheel is prevented from skidding when the vehicle turns.

Another advantage of the first embodiment is the provision a suspension controller in which the suspension characteristic is altered to the 'SOFT' state in response to the sporadic vibration of the vehicle or the vibration caused by an engine vibration mixed with a vibration from the road surface. Accordingly, the first embodiment improves riding comfort of the vehicle.

Another advantage of the first embodiment is the provision of a suspension controller in which the alteration of the suspension characteristic is performed on the basis of the rear vehicle height data HR indicative of the displacement of the vehicle height that has a great influence on the feeling of passengers on the rear sheats. Therefore, the resonant vibration of unsprung mass that has a negative effect on the riding comfort is promptly ceased. Accordingly, riding comfort of the vehicle is enhanced.

A further advantage of the first embodiment is the provision of a suspension controller, in which the resonant vibration of unsprung mass is absorbed rapidly by setting the suspension characteristic to the 'HARD' state, while the riding comfort is aimed for the normal cruising of the vehicle by setting it to the 'SOFT' state. Accordingly, the first embodiment operated as above enables to expanded freedom is designing the suspension characteristic by eliminating the need to sacrifice of a suspension characteristic adjustment.

The present embodiment performs the alteration control into two stages, namely, the 'SOFT' and the 'HARD' states. Another alteration control adopting more than two stages, including the 'SPORT' state, namely, the intermediate state between the above-mentioned two states, however, is possible. That is realized by combining other suspension characteristics, such as the spring constant of the air suspensions S1R, S1L, S2R and S2L, damping force of the shock absorber, the stiffness of the suspension bush or the stabilizer. Owing to the provision of the intermediate state, it is made possible to absorb rapidly the resonant vibration of unsprung mass.

An outline of the construction of the second embodiment is explained with reference to FIG. 10. The present embodiment includes vehicle height detection means respectively provided with the front and the rear wheels (M21, M22) and a vehicle height determination means M52 for judging the amplitude of the vehicle height vibration. A cycle time determination means M26 determines the cycle time of the vehicle height vibration in the same manner as the first embodiment. A control means M23 (including the vehicle height determination means M25 and the cycle time determination means M26 in the second embodiment) and a suspension characteristic alteration means M24 respectively function in the same manner as the control means M5 and the suspension characteristic alteration means M2 of the first embodiment.

In the suspension controller according to the second embodiment structured as mentioned above, the vehicle height determination means M25 determines if the amplitude of the vehicle height data detected by the front and the rear height detection means M21, M22 satisfy a predetermined condition. The cycle time determination means M26 determines if the cycle-time of the change in the vehicle height data is within a predetermined range. The control means M23 determines if the vibration of the vehicle body satisfies a predetermined condition so as to activate the suspension characteristic alteration means M24 when it is determined that the amplitude of the vibration satisfies the predetermined condition and the cycle time of the change in the vehicle height data is also in the predetermined range. The suspension characteristic alteration means M24 alters the suspension characteristic on the basis of the aforementioned determination.

Accordingly, the suspension controller according to the second embodiment acts to absorb the vibration exerted to the vehicle body having the amplitude that satisfies the predetermined condition and having a cycle-time within the predetermined range.

The present embodiment is operated as above so as to solve the conventional problems.

The structure of the second embodiment is substantially the same as that according to the first embodiment shown in FIGS. 1–7. The suspension control processing steps of this embodiment executed by the ECU 4 will be explained with reference to the flowchart shown in FIGS. 11A–11B. The suspension control processing steps are initiated and repeatedly executed when the vehicle is started and accelerated to be moving at a constant speed ranging in 30–80 km/h and 'AUTO' mode is selected by the drive. The processing steps of the present suspension control are interrupted by the vehicle height detecting processing steps initiated by the soft timer (not shown). The vehicle heights is respectively detected from the left and right front vehicle height sensors H1L and H1R and the rear vehicle height sensor H2c consecutively, every predetermined time interval (for example 8 msec. in the second embodiment), each of the front vehicle height data HF and rear vehicle height data HR are converted into displacements from the reference vehicle height data and successively replaced by new data. Therefore, updated vehicle height data and the previous data are respectively stored in predetermined locations in the RAM 4c.

The processing step according to the present suspension control are executed under such condition. Hereinunder is a summary of the present processing steps.

(1) It is determined (step 500) if the updated vehicle height data HR (it is displacement from a reference vehicle height) is greater than or equal to a reference value H0.

(2) If the result of decision is 'YES', it is determined (step 505) if the rear wheel is in the condition of "caught in" a dip, namely, "rebounded" state or in the condition of "hitting" a bump, namely, "bounded" state.

(3) If the rear wheel is determined to be in the condition "caught in" a dip in the steps of Paragraph (2), after confirming the front part of the vehicle being reversed to the rear part, a semi-cycle time of the vibration is measured. When the semi-cycle time of the vibration is greater than or equal to the minimum semi-cycle time TC for judging the pitching of the vehicle and less than or equal to the maximum semi-cycle time TD for judging the pitching of the vehicle, the suspension characteristic is altered to the 'HARD' state (steps 510, 515, 525, 530, 540, 545, 555, 560 and 565).

(4) If the rear wheel is determined to be in the condition "hitting" a bump in the steps of Paragraph (2), after it is confirmed that the movement of the vibrations exerted to the front part of the vehicle is opposite to the movement of the rear part, a semi-cycle time of the vibration is measured. When the semi-cycle time of the exerted vibration is greater than or equal to the minimum semi-cycle time TC for judging the pitching of the vehicle and not more than the maximum semi-cycle time TD for judging pitching of the vehicle is altered (steps 710, 715, 725, 730, 740, 745, 755, 760 and 765), the suspension characteristic is altered to the 'HARD' state.

(5) After the suspension characteristic is altered to the 'HARD' state in the steps described in paragraphs (3) or (4), measurement of the semi-cycle time is begun. If the rear vehicle height data HR is not greater than the reference value H0 after a reference time interval TA for returning the suspension characteristic is elapsed, the suspension characteristic is altered (steps 570, 570, 500 and 505) to "soft" state.

Details of the processing steps of the rear suspension control according to the present embodiment are explained below.

Figure 11A:
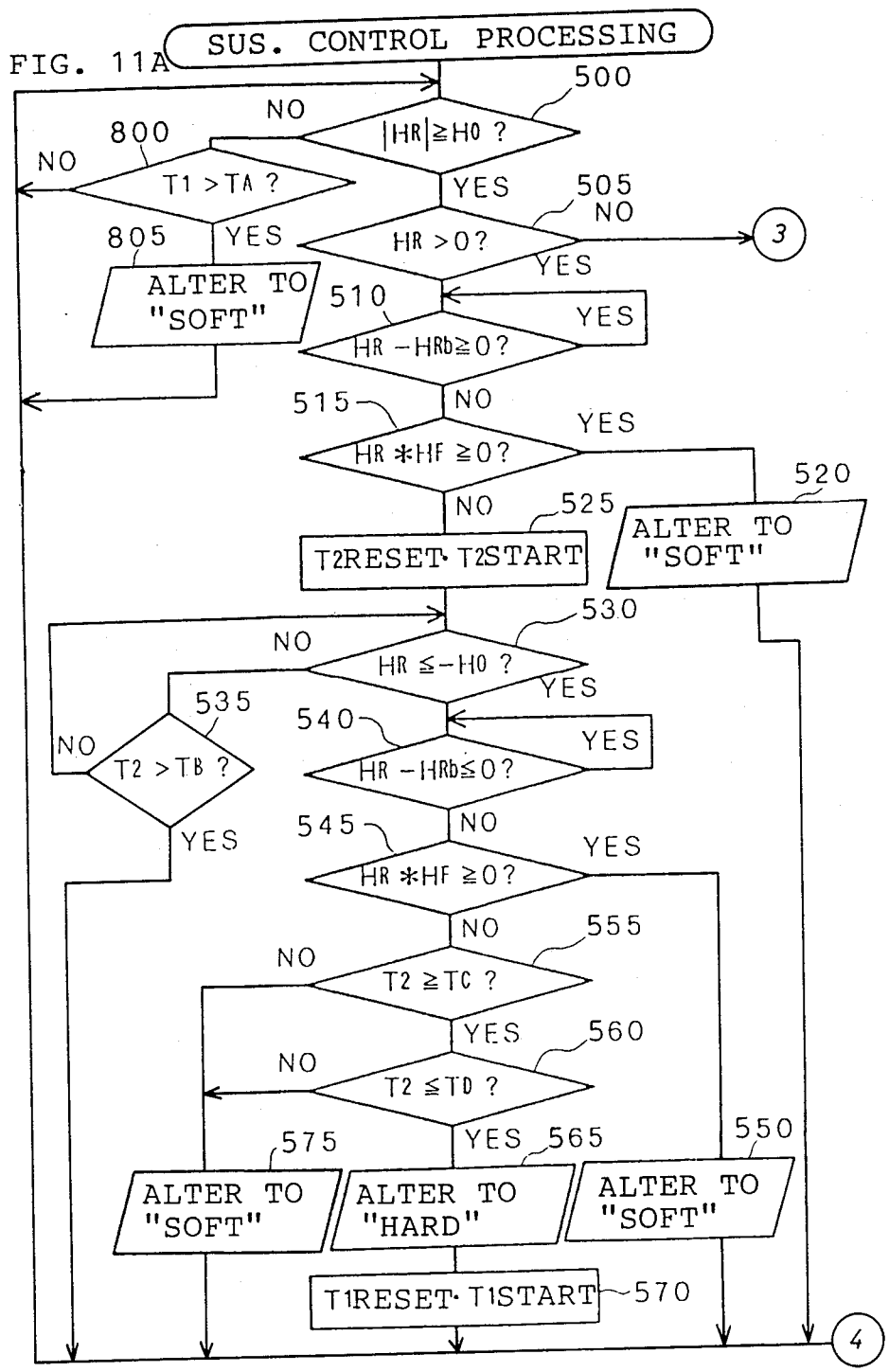
FIG. 11A and FIG. 11B are flowcharts of processing steps executed by the ECU according to the second embodiment.

First, it is determined if the absolute value of a rear vehicle height data HR (here, it is a displacement from a reference vehicle height) is greater than or equal to the reference value H0 at step 500 in FIG. 11A. Here, the rear vehicle height data HR is a displacement from the reference vehicle height updated every predetermined time interval. Accordingly, the values of the height data HR may be a negative or positive. If the rear wheel hits a bump or gets caught in a bump, the degree of which is greater than a predetermined range, the absolute value of the vehicle height data HR is greater than the reference value H0, then the processing step is advanced to step 505.

At step 505, it is determined if the value of the rear vehicle height data HR is positive or negative. In particular, when the rear wheel is caught in a dip of the road surface, the distance between the wheel and vehicle body is made substantially larger, and then the rear vehicle height becomes greater than the reference vehicle height. Accordingly, the rear vehicle height data HR takes a positive value. Conversely, when the rear wheel hits a bump of the road surface, the distance between the wheel and the vehicle body is made substantially less, and then the rear vehicle height becomes less than the reference vehicle height. Accordingly, the rear vehicle height data HR stakes a negative value. If the rear wheel is determined to be "caught in" a dip, the processing step is advanced to step 510 in FIG. 11A, while the processing step is advanced to step 710 in FIG. 11B if the rear wheel is determined to be "hitting" a bump, however, the subsequent steps are the same in either case. Therefore, explanation is continued on the assumption that the rear wheel is in the condition of "caught in" a dip.

At step 510, it is determined if the updated rear vehicle height data HR is greater than and equal to the previous vehicle height data HRb. Specifically, consecutive execution of such processing step leads to detection of the time point when the updated vehicle height data becomes lower than the vehicle height data HRb, thus enabling detection of the point at which the updated rear vehicle height data HR becomes maximum. The processing step at step 510 is repeatedly executed until the maximum value of the updated rear vehicle height data HR is detected. When the maximum value is detected, the processing step is advanced to step 515. At step 515, it is determined if the product of the updated rear vehicle height data HR and the updated front vehicle height data HF is positive or negative. If the vehicle is vibrated in the condition that the front part and back part are bounding in the same direction at the same time (bouncing state), the product takes a positive value. On the contrary, if the vehicle is vibrated in the condition that the front part and the back part are bounding in the opposite direction (pitching state), the product takes a negative value. Namely, it is determined if the vehicle body is in the bouncing state in the pitching state at step 515. If the product takes a positive value indicative of the bouncing state of the vehicle body the processing step is advanced to step 520 for altering the suspension characteristic to the 'SOFT' state. In particular, the processing steps for altering the suspension characteristic to the 'SOFT' state are such that to lower the spring constant of the air spring by way of activating the actuators A1R, A1L, A2R and A2L for communicating the main air chambers S1Ra, A1La, S2Ra and S2La with the auxiliary air chambers S1Rb, S1Lb, S2Rb and S2Lb via a large section air passage 70 in the air suspensions S1R, S1L, S2R and S2L respectively, or rather to rotate each control rod 20 of the shock absorbers S1Rc, S1Lc, S2Rc, and S2Lc so as to decrease damping force. After that, the processing steps returns to step 500.

Conversely, if the product takes a negative value indicative of the pitching state of the vehicle body, the processing step is advanced to step 525. At step 525, a timer T2 is reset to count the "hitting" time interval. The timer T2 begins to count from a time point at which the updated vehicle height data HR detected at step 510 becomes the maximum value. Subsequently, at step 530, it is determined if the updated rear vehicle height data HR is not more than −H0. Namely, it is determined if the updated rear vehicle height data HR is decreased from the reference vehicle height by more than the reference value H0. The execution of decision at this step is made for detecting the movement of the rear wheel, because, if the vehicle vibration is caused by continuous shocks, the rear wheel caught in the dip at step 510 should hit a succeeding bump. If the updated vehicle height data is determined to be greater than the opposite of the reference value H0, the processing step is advanced to step 535. At this step, it is determined if the counted value in the timer T2 representing the "hitting" time interval is greater than the reference detection time interval TB. If the reference time interval TB has not yet elapsed, the processing step returns to step 530 for repeatedly executing the detection of the rear wheel is "hitting" the bump. On the other hand, when the reference time interval TB has elapsed but the rear wheel in the condition of "getting on" the bump whose value is greater than the reference value H0, the vibration detected at step 500 is determined not continuous but sporadic one and the processing step returns to step 500. The description hereinunder is continued on the assumption that the condition of "hitting" of the rear wheel is detected within the reference time interval TB at step 530. Here, the processing step is advanced to step 540 for determining if the updated rear vehicle height data HR is not more than the rear vehicle height data HRb. The processing executed at this step is for detecting a time point at which the rear vehicle height data HR becomes minimum in the same manner as at step 110. The processing step at this step is repeatedly executed until the minimum value of the updated rear vehicle height data HR is detected. If the minimum value is detected as explained above, the processing step is advanced to step 545. At this step, it is determined again if the vehicle is in the pitching state or in the bouncing state on the basis of the updated height data HR and HF in the manner executed at step 515. If it is determined that the vehicle is in the bouncing state, the processing step is advanced to step 550. At step 550, the suspension characteristic is altered to the 'SOFT' state in the same manner explained in at step 520, and the processing step returns to step 500.

Conversely, if it is determined that the vehicle is in the pitching state, the processing step is advanced to step 555. At step 555, it is determined if the value counted by the timer T2 is not less than the minimum semi-cycle time TC for judging the pitching of the vehicle. In particular, it is determined if the currently detected vibration has a cycle time in a predetermined cycle range on the basis of the value counted by the timer T2 representing the time interval from the time point at which the rear vehicle height detected at step 510 becomes maximum to the time point at which the rear vehicle height detected at step 140 becomes minimum (the time interval corresponds to the semi-cycle time of the detected vibration). The minimum semi-cycle TC for judging the pitching state of the vehicle corresponds to a frequency of about 2 Hz, and is preset at about 0.25 sec. in the second embodiment. If it is determined that the value in the timer T2 is not more than the minimum semi-cycle TC for judging the pitching state of the vehicle, the processing step is advanced to step 160. At step 160, it is determined if the counted value in the timer T2 is greater than the maximum semi-cycle time TD for judging the pitching state of the vehicle. Namely, it is determined if the currently detected vibration has a cycle time in the predetermined cycle range. The maximum semi-cycle time TD for judging the pitching state of the vehicle corresponds to the frequency of about 1 Hz and is preset at about 0.5 sec. according to the second embodiment. If the value in the timer T2 is not more than the maximum semi-cycle time TD for judging the pitching of the vehicle, the processing step is advanced to step 565.

At step 565, the processing step is executed only when the vehicle body is in the pitching state for altering the suspension characteristic to the 'HARD' state.

In particular, the processing step for altering the suspension characteristic to the 'HARD' state is such as to increase the spring constant of the air spring by activating the actuator A1R, A1L, A2R, and A2L for discommunicating the main air chambers S1Ra, S1La, S2Ra and S2La from the auxiliary air chambers S1Rb, S1Lb, S2Rb and S2b in the air suspensions S1R, S1L, S2R and S2L respectively, or to rotate each control rod 20 of the shock absorbers S1Rc, S1Lc, S2Rc and S2Lc so as to increase the damping force. After the timer T1 representing the returning time interval is reset, the timer T1 is started at the subsequent step 570, and the processing step returns to step 500.

At step 555 or 560, however, if the currently detected vibration does not have a cycle time in the predetermined cycle range but has a cycle time shorter or longer than the cycle time range for determining the pitching state, the processing step is advanced to step 575. At step 575, the processing step for altering the suspension characteristic to the 'SOFT' state is executed, and then the processing step returns to step 500.

Figure 11B:
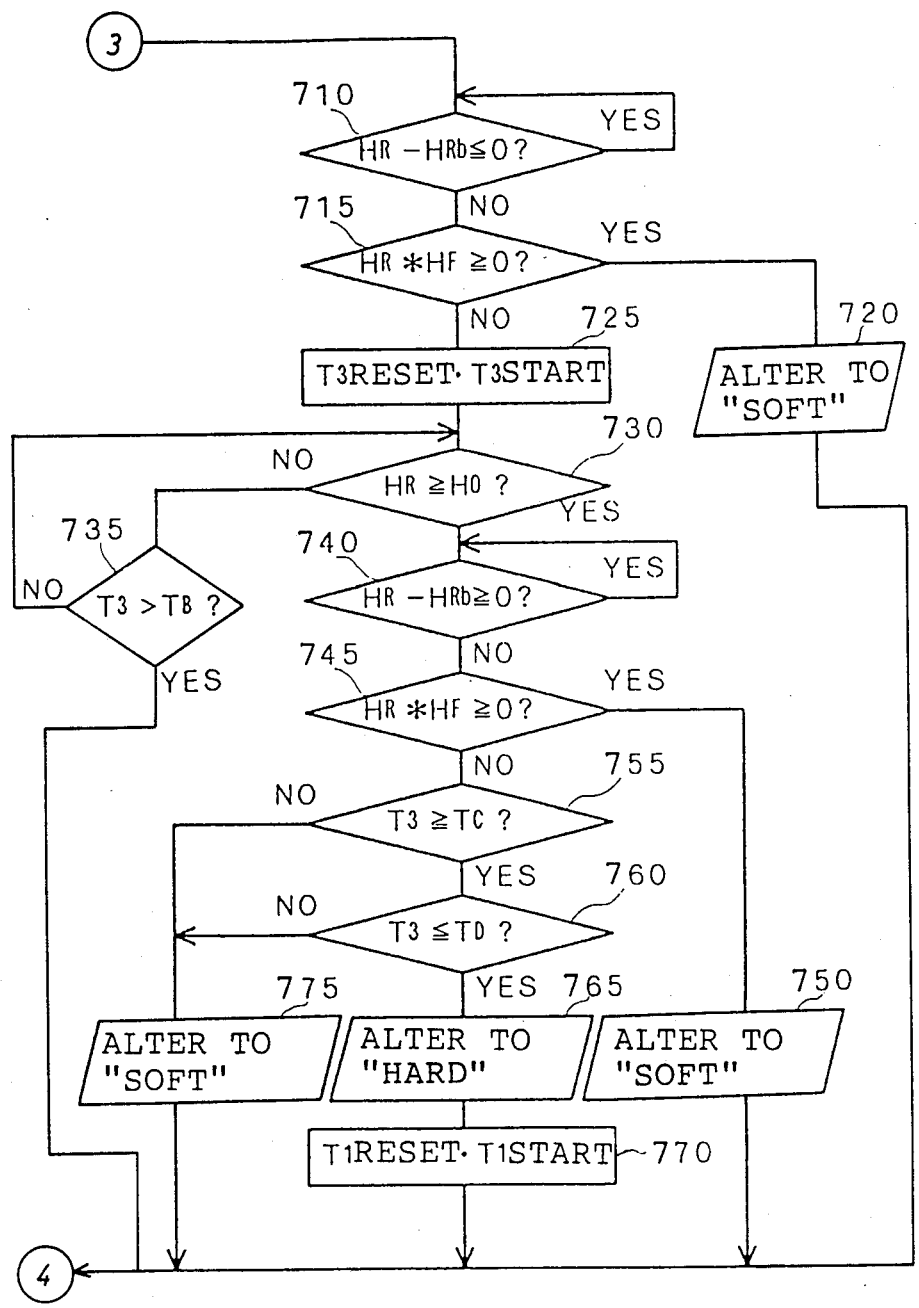

The following is the description for explaining the processing step executed in FIG. 11B when the decision is made that the rear wheel is in the condition of "hitting" a bump as previously mentioned at step 505. The processing steps executed in this case are similar to those executed in the above-mentioned steps 505-575, similar processing steps have the same last two digits steps so as to omit the explanation. At first, the minimum value of the updated rear vehicle height data HR is detected (step 710), and then the vibration of the vehicle is determined (step 715) if the bouncing state or the pitching state. If it is determined that the vehicle is in the bouncing state, the processing step for altering the suspension characteristic to the 'soft' state is executed, and the processing step returns (step 720) to step 500. Conversely, if it is determined that the vehicle is in the pitching state, a timer T3 begins counting a "caught in" time interval (step 725), and detects (step 730, 735) that the rear wheel is shifted in the condition of "caught in" the dip in proportion to the elapsed time. If the condition of "caught in" the dip of the rear wheel is not detected within a reference detection time TB, the processing returns to step 500.

If it is detected that the rear wheel is in the condition of "caught in" the dip, the maximum value of the updated rear vehicle height data is detected (step 740), and it is determined again if the vehicle is in the bouncing state or in the pitching state (step 745). If it is determined that the vehicle is in the bouncing state, the suspension characteristic is altered to the 'SOFT' state, and the processing step returns to step 500 (step 750). On the other hand, if it is determined that the vehicle is in the pitching state, it is determined (steps 755, 760) if the counted value in the timer T3 is not less than the minimum semi-cycle time TC for judging the pitching of the vehicle is not more than the maximum semi-cycle time TD for judging the pitching state of the vehicle. If it is determined that the vibration has a cycle time within the predetermined cycle range, the suspension characteristic is altered to the 'HARD' state. The timer T2 begins to count the returning time interval, and then the processing step returns (steps 765, 770) to step 500. On the other hand, if it is determined that the vibration does not have a cycle time within the predetermined cycle range, the suspension characteristic is altered to the 'SOFT' state, and the processing step returns (step 775) to step 710.

As previously described, in the case the processing step returns again to step 500 after altering the suspension characteristic to the 'HARD' state at step 565 and 765 and the updated rear vehicle height data HR is not more than the reference value H0, i.e. in the case the vibration of the vehicle is absorbed by the alteration of the suspension characteristic, the processing step is advanced to step 800. At step 800, it is determined if the value in the timer T1 counted at step 570 or 770 as mentioned before is greater than a reference returning time interval TA. If the returning time interval TA has not yet elapsed, the processing step returns to step 100. However, if the updated vehicle height data HR is not greater than the reference value H0, and the reference time interval TA has elapsed, it is determined that the vibration is damped thoroughly because of the alteration of the suspension characteristic to the 'HARD' state, and the processing step is advanced to step 805. At step 805, the suspension characteristic is altered to the 'SOFT' state and the processing step returns to step 500. The present routine is repeatedly executed only when the vehicle is in the cruising condition and 'AUTO' mode is selected by the driver.

One example of the control timing for the above-mentioned suspension control is explained hereinunder with reference to the timing chart shown in FIG. 12.

A time point t21 indicates when the rear wheel begins to be caught in the dip of the road surface and the rear vehicle height data HR is greater than the reference value H0. From the time point t21, the maximum value of the rear vehicle height data HR begins to be detected. A time point t22 indicates when the maximum value of the rear vehicle height data HR is detected. Accordingly, the timer T2 begins to count the "hitting" time interval from the time point t22. Furthermore, at the time point t22, it is detected that the product of the front vehicle height data HF and the rear vehicle height data HR is negative, thus confirming the pitching state of the vehicle body. From the time point t22, detection of the rear wheel "hitting" a bump due to the reaction of the "caught into" the dip is initiated, and at a time point t23 the value of the rear vehicle height data HR is decreased to become lower than the reference value H0. From the time point t23, detection of the minimum value of the rear vehicle height data HR is begun, and the minimum value is detected at a time point t24. Here, it is reconfirmed that the product of the front vehicle height data HF and the rear vehicle height HR is negative. The timer T2 counts the time interval from the time point t22 at which the maximum value of the rear vehicle height data HR is detected to the time point t24 at which the minimum value of the rear vehicle height data HR is detected. If the counted value is determined to be in the range greater than the minimum semi-cycle time TC for judging the pitching state of the vehicle and is less than the maximum semi-cycle time TD for judging the pitching state of the vehicle, it is determined that the vibration exerted to the vehicle body has a frequency ranging from 1-2 Hz indicative of the pitching state of the vehicle body. At the time point t24, processing step for altering the suspension characteristic from the 'SOFT' to the 'HARD' state begins, and the suspension characteristic is altered to the 'HARD' state at a time point t5. The timer T1 is started to count the returning time interval from the time point t4. After the time point t24, the rear vehicle height data HR begins to approach to the standard vehicle height, and the absolute value of the rear vehicle height data HR becomes less than the reference value H0 at a time point t26. Since the suspension characteristic has been already altered to the 'HARD' state at the time point t5, the pitching state is rapidly calmed down and the absolute value of the rear vehicle height data HR falls down in the range of the reference value H0. At a time point t7, the counted value in the timer T1 is greater than the reference returning time interval TA. Therefore, at a time point point t27, a decision is made that the pitching state is calmed down, then the processing step is started to alter the suspension characteristic from the 'HARD' to the 'SOFT' state. Accordingly at a time point t8, the suspension characteristic is altered to the 'SOFT' state. The measurement of the semi-cycle time of the change in the rear vehicle height data HR is performed in the same manner as described above, if the absolute value of the rear vehicle height data HR is greater than the reference value H0 and the displacement of the front wheel is opposite to that of the rear wheel, while performing the processing step for altering the rear suspension characteristic to the 'HARD' state is the semi-cycle time of the change in the rear vehicle height data HR is determined to be greater than the minimum semi-cycle time TC for judging the pitching state of the vehicle body and to be less than the maximum semi-cycle time TD for judging the pitching of the vehicle body. In addition, in the case that the absolute value of the rear vehicle height data HR is determined to be greater than the reference value H0 and the displacement of the front wheel is in the same direction as that of the rear wheel, the suspension characteristic is altered to the 'SOFT' state, though the explanation of the alteration is omitted in the drawing.

Figure 10:
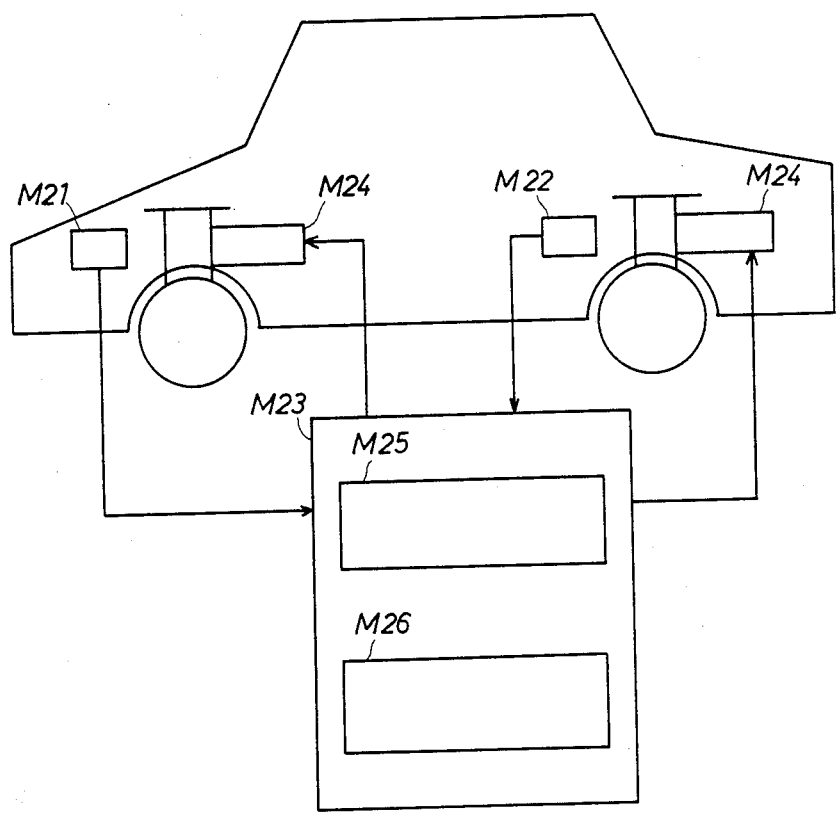
FIG. 10 is a schematic view showing a basic structure of the second embodiment according to the present invention.

In the second embodiment, the front vehicle height sensors H1L and H1R, and the ECU 4 function as front vehicle height detection means M1 of FIG. 10, the rear vehicle height sensor H2C and the ECU 4 and the processing step executed by the ECU 4 function as the rear vehicle height detection means M22, the ECU 4 function as the control means M23, and the right and left front air suspensions S1R, S1L and the right and left rear suspensions S2R S2L and the ECU 4 and the processing steps (steps 520, 550, 565, 575, 720, 750, 765, and 775) executed by the ECU function as the suspension characteristic alteration means M24. In addition, the ECU 4 and the processing steps (steps 500, 530, and 730) executed by the ECU 4 function as the vehicle height determination means M25, and the ECU 4 and the processing steps (step 525, 555, 560, 525, 555 and 760) function as the cycle time determination means M26.

As described in detail above, the second embodiment operates to detect when the rear vehicle height data HR is greater than the reference value H0 for determining if the vehicle is in the bouncing state or in the pitching state. The rear suspension characteristic is altered to the 'SOFT' state when the vehicle is in the bouncing state, while the suspension characteristic is altered to the 'HARD' state when the vehicle is in the pitching state. When the semi-cycle time of the vibration is in the range from the minimum semi-cycle time TC for judging the pitching state of the vehicle to the maximum semi-cycle time TD for judging the pitching state of the vehicle, the vehicle deemed to be in the pitching state.

One advantage of the second embodiment constructed as above is to provide a suspension controller which rapidly calms down the pitching state of the vehicle, after detection of a pitching vibration having a cycle time within a predetermined range (frequency 1-2 Hz) so as to maintain drivabilitly and stability on high level.

Another advantage of the second embodiment is the provision of a suspension controller in which a suspension characteristic is altered to the 'SOFT' state against the bouncing state of the vehicle for absorbing the shock from the road surface so as to improve the riding comfort of the vehicle.

Still another advantage of the second embodiment is the provision of a suspension controller in which the suspension characteristic alteration is appropriately performed in response to the vehicle state based on the rear vehicle height data HR indicative of a rear vehicle height change affecting a great influence to the riding comfort of passengers. Therefore, a vibration having a cycle time within a predetermined cycle range is absorbed rapidly, thus the riding comfort of the vehicle is enhanced.

Another advantage of the second embodiment is the provision of a suspension controller that enables prevention of "nose dive" of the vehicle even when the sudden braking occurs, since the suspension characteristic is altered to the 'HARD' state against the pitching state of the vehicle, thus preventing the bottom of the front part of the vehicle from being scraped by the road surface.

Another advantage of the second embodiment is to provide a suspension controller in which the suspension is preset to the 'SOFT' state for the normal cruising condition of the vehicle, while presetting it to the 'HARD' state against the pitching state periodically repeated. Thus, the second embodiment as above enables expanded freedom in designing the suspension characteristic, eliminating a sacrifice of either suspension characteristic adjustment. The second embodiment structured as above removes the need to favor one suspension characteristic over the other, thus enabling expanded freedom degree in presetting of the suspension characteristic.

The second embodiment performs the alteration control between two stages, i.e. the 'SOFT' state and the 'HARD' state, however, it is possible to employ an alternative alteration control adopting at least three stages including a 'SPORT' state, i.e., the intermediate state between the above-mentioned two states and the 'SPORT' state. This alternative is realized by combining the other suspension characteristics, such as the spring constant of the air suspensions S1R, S1L S2R and S2L, damping force of the shock absorber, the stiffness of the suspension bush or the stabilizer. By adopting at least three stages, it becomes possible to rapidly absorb the various kinds of vibrations having various amplitudes and cycle times.

Although the second embodiment is constructed to alter the suspension characteristic of the front wheel and the rear wheel synchronously, the same effect is achieved even if it is constructed to alter only the rear suspension characteristic which has a great influence to the riding comfort of the passengers. In the second embodiment, the suspension characteristic is altered in response to 'bouncing' state and 'pitching' state, however, it may well be altered in response to the various conditions made by combining the amplitude of the vibration with cycle time thereof. If the suspension characteristic is altered in response to various conditions described above, the most preferable suspension characteristic is able to be preset.

Examples of suspension characteristic alteration means apart from any air suspensions are described below.

Figure 13A:
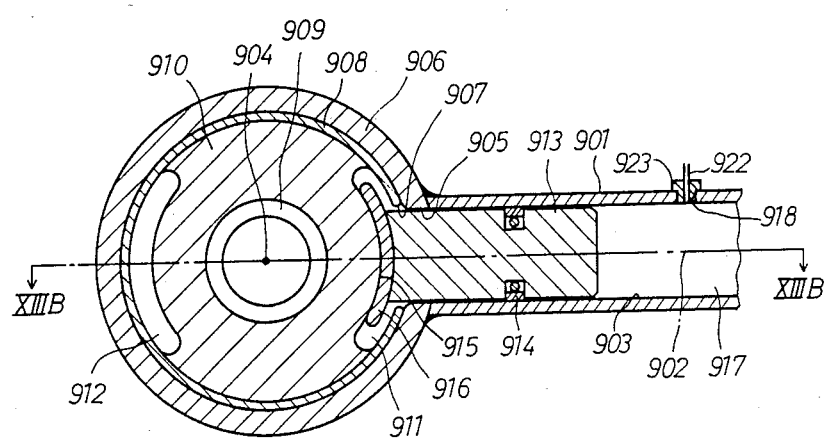
FIG. 13A is a longitudinal cross-section of the first example.
Figure 13B:
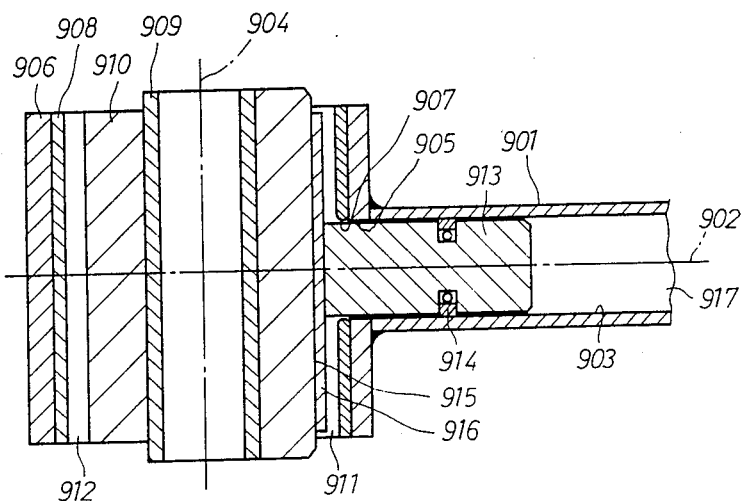
FIG. 13B is a cross-sectional view taken along line XIIIB—XIIIB of FIG. 13A.

The first example is a bush for joining suspension bars such as the upper and lower control arms of a suspension, as shown in FIGS. 13A and 13B. The stiffness of the bush can be changed so as to alter the characteristic of the suspension. The spring constant and damping force of the bush are varied accompanied with changes of the bush stiffness.

FIG. 13A shows a sectional view of the joint of the suspension bar. FIG. 13B shows a sectional view taken on line XIIIB—XIIIB of FIG. 13A. In the drawings, numeral 901 designates a control arm extending along an axis 902 and having a hole 903. A sleeve 906, which extends along an axis 904 perpendicular to the axis 902 and which has a hole 905, is welded around the hole 905 at one end of the control arm 901. An outer cylinder 908 having a hole 907 is press-fitted in the sleeve 906. An inner cylinder 909 is provided in the outer cylinder 908 concentrically thereto. A bush 910 made of vibration-proof rubber is interposed between the outer cylinder 908 and the inner cylinder 909. The bush 910 and the outer cylinder 908 define arc-shaped openings 911 and 912 which are located to be opposed to each other along the axis 904, thus the stiffness in the direction of the axis 902 is set at a relatively low value. The hole 903 of the control arm 901 constitutes a cylinder which supports a piston 913 for movement back and forth along the axis 902. A sealing member 914 is tightly packed in between the piston 913 and the inside surface of the hole 903. A contact plate 916 is secured at one end of the piston 913. The contact plate 916 curves about and extends along the axis 904, thus being brought into contact with the inside surface 915 of the opening 911.

The other end of the control arm 901 is constructed as shown in FIGS. 13A and 13B. A cylinder chamber 917 is defined between the piston 913 and another piston (not shown in the drawings) and is fitted with the other end of the control arm 901. The cylinder chamber 917 is connected with the exterior through a tapped hole 918 provided in the control arm 901. A nipple 923, fixed on one end 922 of a conduit connected to an oil pressure source (not shown in the drawings), is secured in the tapped hole 918 to apply oil pressure to the cylinder chamber 917.

When the oil pressure in the cylinder chamber 917 is relatively low, the force pushing the piston 913 leftward in the drawings is so weak that the piston is held in the position shown in the drawings wherein the contact plate 916 is brought into light contact with the inner surface 915 of the bush 910. As a result, the stiffness of the bush 910 in the direction of the axis 902 is made relatively low. When the oil pressure in the cylinder chamber 97 is relatively high, the piston 913 is driven leftward in the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is raised.

If a suspension bar is provided between the body and the wheel of a vehicle, the characteristic of the suspension for the rear wheel can be altered by controlling the oil pressure in the cylinder chamber 917 through the action of an actuator such as a pressure control valve. When the oil pressure is raised by an instruction from the ECU 4, the stiffness of the bush 910 is enhanced to increase the damping force and spring constant of the suspension. Thus, the suspension characteristic is altered to the 'HARD' state so as to improve the controllability and stability of the vehicle. When the oil pressure is lowered, the damping force for the rear part of the vehicle is reduced.

Figure 14A:
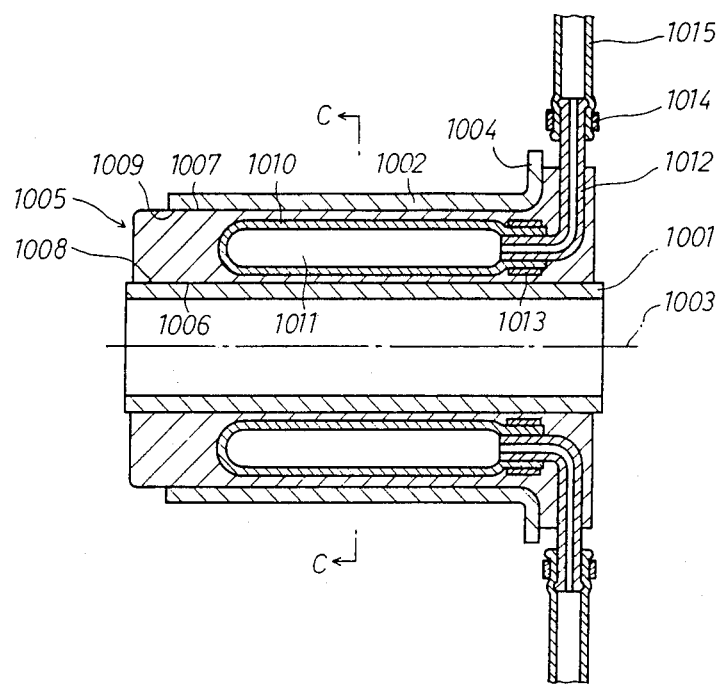
Figure 14B:
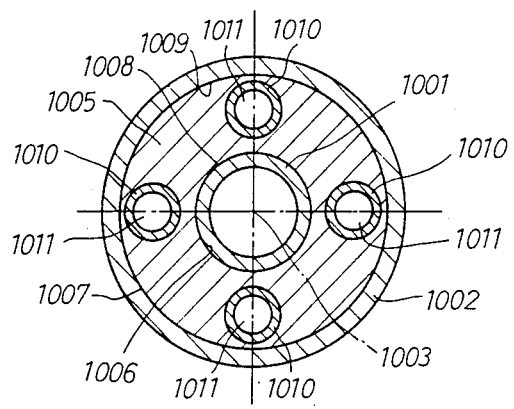
FIG. 14B is a cross-sectional view taken along line XIVB—XIVB thereof.

The second example is another bush which is shown in FIGS. 14A and 14B and which have the same function as the former.

FIG. 14A shows a sectional view of the bush integrally constructed with inner and outer cylinders as a bush assembly. FIG. 14B shows a sectional view taken on line XIVB—XIVB of FIG. 14A. In the drawings, four expansible and compressible hollow bags 1010, which extend along an axis 1003 and which are separately located in equiangular positions around the axis, are embedded in a bush 1005. The hollow bags 1010 define four chambers 1011 extending along the axis 1003 and being separately located at equiangular positions around the axis. Each hollow bag 1010 is secured at one end on one end of a coupler 1012, embedded in the bush 1005 by a clamp 1013, so as to connect the chambers 1011 with the exterior by means of the coupler 1012. One end of a hose 1015 is fixedly connected to the other end of the coupler 1012 by a clamp 1014, and the other end of the hose 1015 is connected to a compressed air source by means of an actuator such as a pressure control valve (not shown in the drawings). The controlled air pressure can be introduced into each chamber 1011. When the actuator is put in operation by the ECU 4, the air pressure in each chamber 1011 can be varied to change the stiffness of the bush in a continuous manner. The stiffness of the bush can thus be appropriately altered to be high (HARD) or low (SOFT) after a shock at the front wheels is detected.

FIGS. 15A–15G show a construction of a stabilizer as the third example.

Figure 15A:
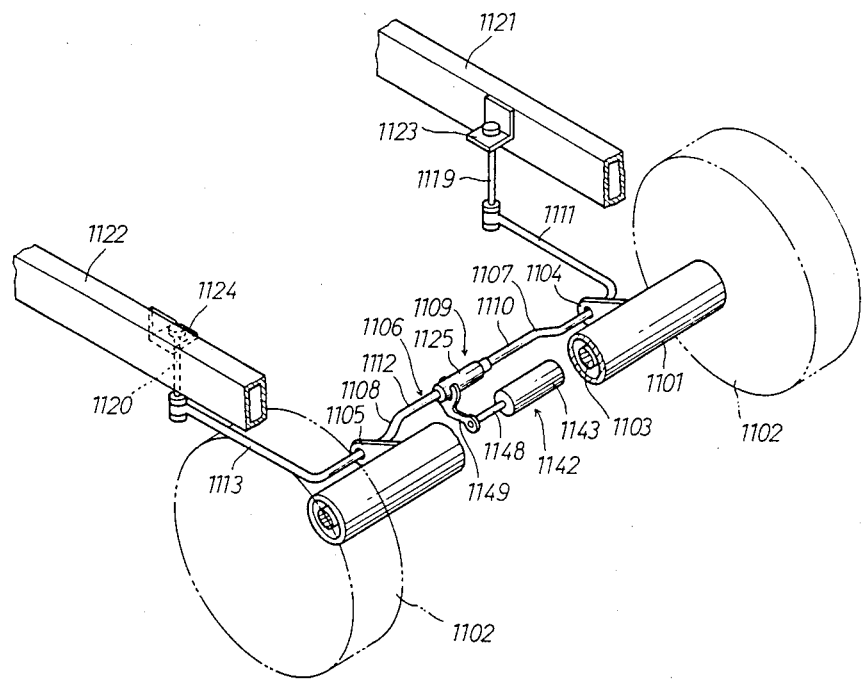
FIG. 15A is a perspective view of the third example in the engaged state.
Figure 15B:
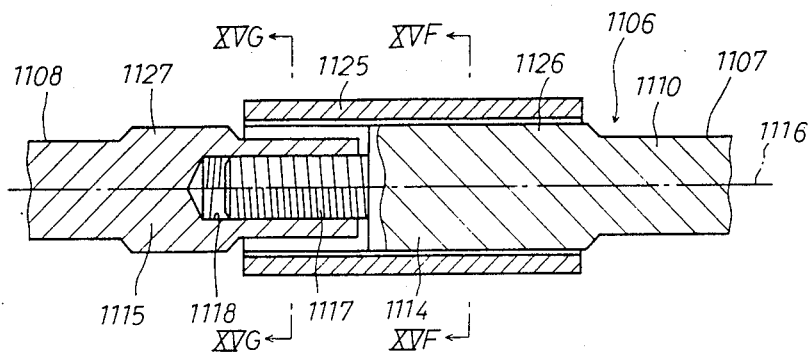
FIG. 15B and FIG. 15C respectively show partially enlarged cross-sections of the third example.
Figure 15C:
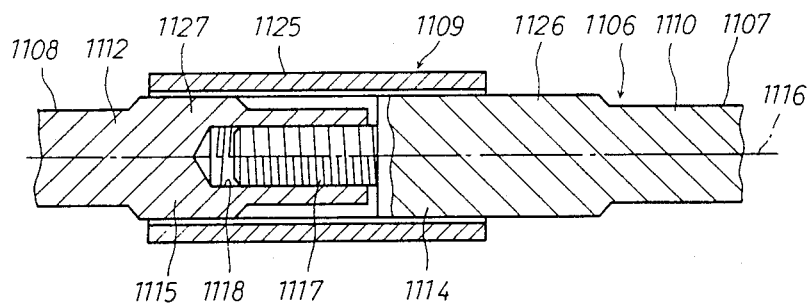
Figure 15D:
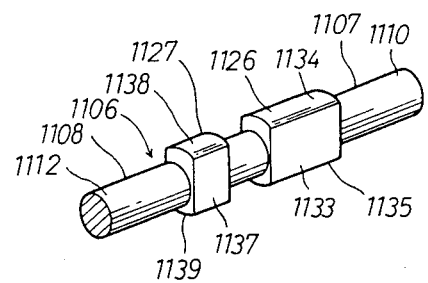
FIG. 15D is a perspective view showing a main portion thereof.
Figure 15E:
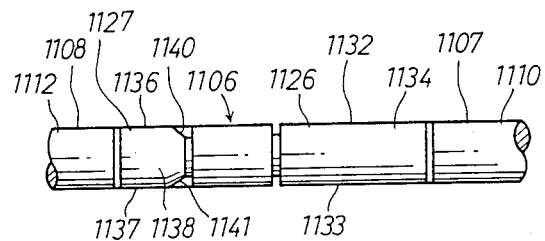
FIG. 15E is a plan view thereof.
Figure 15F:
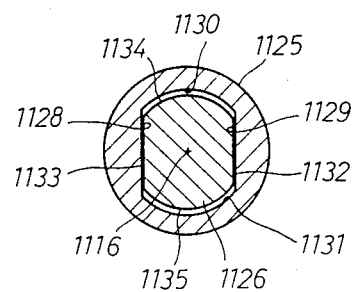
FIG. 15F is a cross-sectional view taken along line XVF—XVF of FIG. 15B.
Figure 15G:
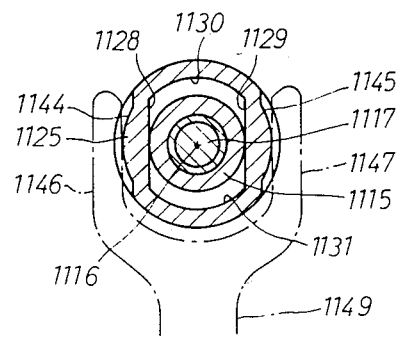
FIG. 15G is a cross-sectional view taken along line XVG—XVG of FIG. 15B.

FIG. 15A shows an exploded perspective view of a torsion-bar-type stabilizer built in an axle-type suspension of an automobile. FIGS. 15B and 15C respectively show enlarged partial sectional views of the main part of the stabilizer of FIG. 15A in the coupled and uncoupled states. FIG. 15D shows a perspective view of the main part shown in FIGS. 15B and 15C, omitting the clutch. FIG. 15E shows a plan view of the main part shown in FIG. 15D. FIG. 15F shows a cross-sectional view taken on line XVB—XVB of FIG. 15B. FIG. 15G shows a cross-sectional view taken on line XVG—XVG of FIG. 15B.

In the drawings, an axle 1103 coupled with wheels 1102 is rotatably supported by an axle housing 1101. A pair of brackets 1104 and 1105 is secured on the axle housing 1101 in positions separated from each other in the direction of the width of the body. A torsion-bar-type stabilizer 1106 is coupled to the axle housing 1101 by means of bushes (not shown in the drawings) by the brackets 1104 and 1105.

The stabilizer 1106 includes a right portion 1107 and a left portion 1108 which can be selectively coupled to each other by a coupling unit 1109. A protrusion 1117 and a hole 1118, which extend along an axis 1116, are respectively formed at the ends 1114 and 1115 of rods 1110 and 1112 opposite the arms 1111 and 1113, as shown in FIG. 15B. The protrusion 1117 and the hole 1118 are respectively constructed as a male screw and a female screw which are engaged with each other so as to couple the rods 1110 and 1112 rotatably relative to each other around the axis 1116. The tips of the arms 1111 and 1113 are coupled to brackets 1123 and 1124, secured on side frames 1121 and 1122 of the vehicle by links 1119 and 1120. As shown in FIG. 15C, the coupling unit 1109 includes a cylindrical clutch 1125, a clutch guide 1126 and a clutch bearer 1127. The clutch guide 1126 is provided at one end 1114 of the rod 1110 and supports the clutch 1125 non-rotatably around the axis 1116 but permitting movement back and forth along the axis. The clutch bearer 1127 is provided at the end 1115 of the rod 1112 and bears the clutch 1125 non-rotatably around the axis 1116. The inside circumferential surface of the clutch 1125 includes planer surfaces 1128 and 1129 facing each other relative to the axis 1116 and extending in parallel with each other along the axis, and partially cylindrical surfaces 1130 and 1131 adjoining the planer surface and opposed to each other relative to the axis 1116, as shown in FIG. 15F which is a cross sectional view taken along line XIIIB—XIIIB of FIG. 15B. Corresponding to the inside circumferential surface of the clutch 1125, the peripheral surface of the clutch guide 1126 includes planar surfaces 1132 and 1133 facing each other relative to the axis 1116 and extending in parallel with each other along the axis, and partially cylindrical surfaces 1134 and 1135 adjoining the planner surfaces and opposed to each other relative to the axis 1116. The peripheral surface of the clutch bearer 1127 includes planar surfaces 1136 and 1137 facing each other relative to the axis 1116 and extending in parallel with each other along the axis, and partially cylindrical surfaces 1138 and 1139 adjoining the planes in positions opposed to each other relative to the axis 1116, as shown in FIG. 15D or FIG. 15E.

The planes 1132 and 1133 of the clutch guide 1126 are always engaged with those 1128 and 1129 of the clutch 1125 as shown in FIG. 15F. When the clutch 1125 is in a position shown in FIG. 15C, planes 1136 and 1137 of the clutch bearer 1127 are also engaged with those 1128 and 1129 so that the right portion 1107 and the left portion 1108 of the stabilizer are integrally coupled to each other so as not to rotate along the axis 1116. As shown in FIG. 15E, the ends 1140 and 1141 of the planes 1136 and 1137 of the clutch bearer 1127 at the right portion 1107 of the stabilizer are chamfered. Even if the rods 1110 and 1112 are slightly rotated relative to each other around the axis 1116, the clutch 1125 can be moved from the position shown in FIG. 15B to the position shown in FIG. 15C. The right portion 1107 of the stabilizer is thus integrally coupled to the left portion 1108 thereof as the arms 1111 and 1113 of the portions are on the same plane.

The clutch 1125 is moved back and forth along the axis 1116 by an actuator 1142 controlled by the ECU 4. The actuator 1142 shown in FIG. 15A includes a hydraulic piston-cylinder unit 1143 secured on a differential casing (not shown in the drawing), and a shifting fork 1149. The fork 1149 has arms 1146 and 1147 engaged in grooves 1144 and 1145 of the peripheral surface of the clutch 1125, as shown in FIG. 15G, and is coupled to the piston rod 1148 of the piston-cylinder unit 1143 shown in FIG. 15A.

When the clutch 1125 is placed in a position shown in FIG. 15C by the actuator 1142 according to an instruction from the ECU 4, the right portion 1107 and left portion 1108 of the stabilizer 1106 are integrally coupled to each other to reduce the rolling of the vehicle, thus improving its controllability and stability. On the other hand, when the clutch 1125 is placed in a position shown in FIG. 15B by the actuator 1142, the right portion 1107 and left portion 1108 of the stabilizer 1106 can be rotated relative to each other around the axis 1116 to reduce the shock on the vehicle, and particularly to reduce the shock on the wheels of only one side of the vehicle, thus improving the riding comfort of the vehicle.

Figure 16A:
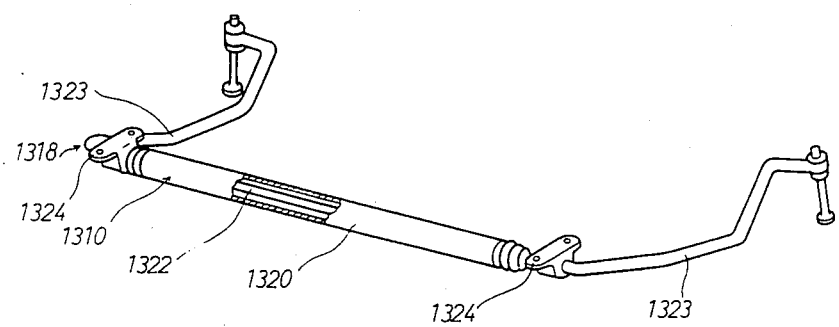
FIG. 16A is a perspective view of the fourth example.
Figure 16B:
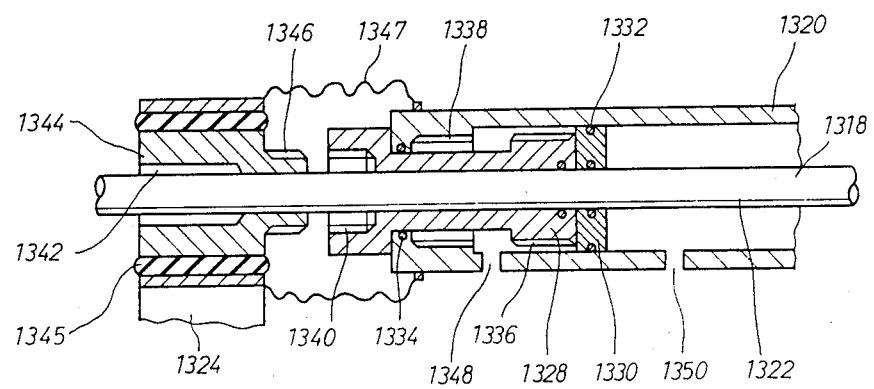
FIG. 16B is a partially enlarged cross-sectional view of FIG. 16A.

FIGS. 16A and 16B show another stabilizer as the fourth example.

A stabilizer-bar-type assembly 1310 includes a first stabilizer bar 1318 and a second stabilizer bar 1320, as shown in FIG. 16A. The first stabilizer bar 1318 includes a main portion 1322 and an arm 1323. The main portion 1322 is attached to the body of a vehicle by a pair of fitting metals 1324 so that the main portion 1322 can be twisted around its axis.

The second stabilizer bar 1320 is hollow so that the main portion 1322 of the first stabilizer bar 1318 extends through the second stabilizer bar, as shown in FIG. 16B. The second stabilizer bar 1320 is disposed inside the pair of fitting metals 1324 so that the first stabilizer bar 1318 can be connected to and disconnected from the second stabilizer. A piston 1330, on which a spool 1328 is secured, is slidably fixed inside one end of the second stabilizer bar 1320 in such a manner that the piston is fluidly sealed by a sealing member 1332. The spool 1328 is sealed by a sealing member 1334, and projects out of the second stabilizer bar 1320. The spool 1328 has splines 1336 near the pistons 1330, while the second stabilizer bar 1320 has, at one end, splines 1338 which can be engaged with the splines 1336. The spool 1328 has other splines 1340 inside the outwardly projecting end thereof.

The coupler 1344 is connected to the main portion 1322 of the first stabilizer bar 1318 by splines 1342. The coupler 1344 has splines 1346 engageable with the splines 1340, which extend from the spool 1328 and which are opposed thereto. The coupler 1344 is connected to the fitting metals 1324 by means of a rubber bush 1345, as shown in FIG. 16B, so that the main portion 1322 of the first stabilizer bar 1318 is twisted by deforming the bush 1345. The coupler 1344 is fitted in such a position that the splines 1340 are engaged with the splines 1346 when the spool 1328 is moved leftward in the drawing, and the splines 1336 are engaged with the splines 1338. A bellowslike boot 1347 for protecting the splines 1340 and 1346 from dust is provided between the coupler 1344 and the second stabilizer bar 1320.

Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 via an actuator such as a pressure control valve, the piston 1330 is moved in the leftward direction as viewed in the drawings, together with the spool 1328. The splines 1336 are engaged with the splines 1338, and the splines 1340 with the splines 1346. As a result, the first and second stabilizer bars 1318 and 1320 are coupled to each other so as to raise the stiffness of the stabilizer bar assembly. On the contrary, when the pressure fluid is led to the other port 1348, the piston 1330 is moved rightward in the drawing, thus the splines are disengaged from each other. As a result, the stiffness of the stabilizer bar assembly is reduced.

Figure 17A:
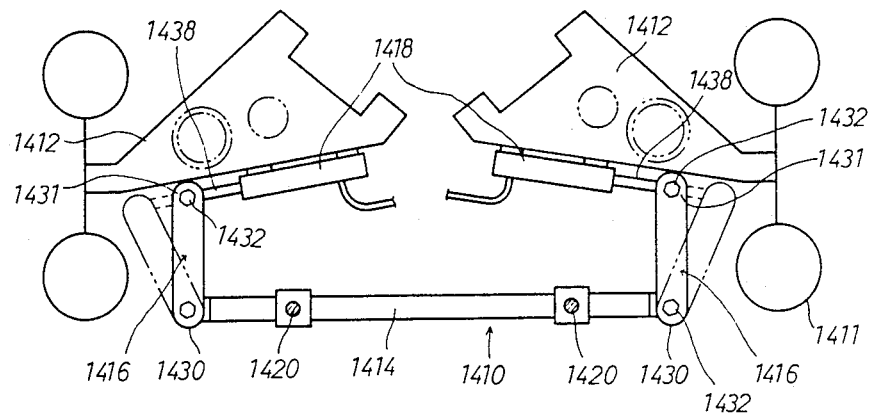
FIG. 17A is a plan view showing a basic structure of the fifth example.
Figure 17B:
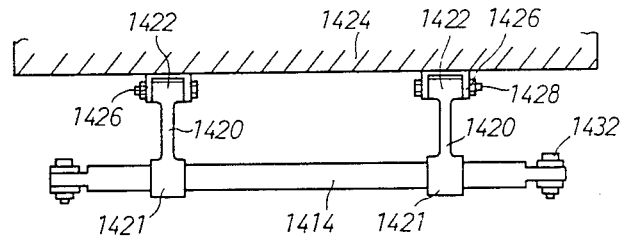
FIG. 17B is an explanatory view showing a part of FIG. 17A.
Figure 17C:
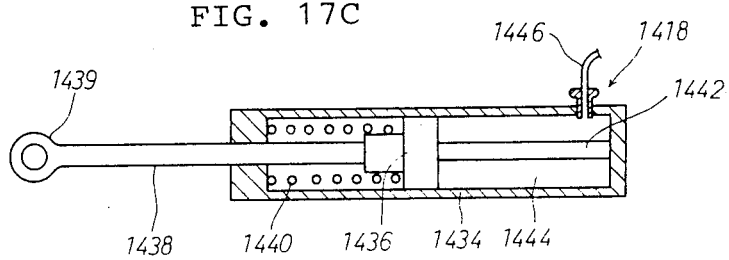
FIG. 17C is a cross-sectional view of an extending part.

FIGS. 17A, 17B and 17C show three different views of still another stabilizer as the fifth example.

FIG. 17A shows a schematic plan view of a stabilizer 1410. In the drawing, numeral 1411 denotes wheels and numeral 1412 denotes suspension arms. The stabilizer 1410 includes a main part 1414, a pair of arms 1416 and extending parts 1418. The main part 1414 in the form of a round bar is laid through bearing portions 1421 of a pair of links 1420 disposed at certain distances apart from each other in the direction of the width of the body 1424 of a vehicle, and is supported by the bearing portions 1421 so that the main part 1414 can be twisted around its axis. The other bearing portions 1422 at the upper ends of the links 1420 are rotatably supported by pins 1428 extending through brackets 1426 welded on the vehicle body 1424. As a result, the main part 1414 is disposed along the width of the vehicle body, and can be twisted relative to the vehicle body.

The pair of arms 1416 are made of flat bars. The first end 1430 of each of arms 1416 are coupled to the end of the main part 1414 by bolts and nuts 1432 so that the arms can be rotated around vertical axes. The second end 1431 of each of the arms 1416 are located at certain distances away from the first ends 1430 to the front-to-rear direction of the vehicle body 1424. The front-to-rear direction is an oblique longitudinal direction.

The second ends 1431 of the arms 1416 are displaced in the direction of the width of the vehicle body 1424 by the extending parts 1418 which may be power cylinders. Each of the power cylinders shown in FIG. 17C includes a cylinder 1434, a piston 1436 fluid-tightly and slidably fitted in the cylinder 1434, a piston rod 1438 which is coupled at one end to the piston 1436 and which projects at the other end out of the cylinder 1434, and a compressed spring 1440 for displacing the piston 1436 in a direction so as to contract the piston rod 1438. A stopper 1442 secured on the piston 1436 prevents the piston from being displaced more than a predetermined distance.

The cylinder 1434 is secured on the suspension arm 1412 in such a manner that the piston rod 1438 is located outside the cylinder 1434 in the direction of the width of the vehicle body. The second end 1431 of the arm 1416 is coupled to the outwardly projecting end 1439 of the piston rod 1438 by the bolts and nuts 1432 so that the arm 1416 can be rotated around the vertical axis.

One end of a flexible hose 1446 is connected to a liquid chamber 1444 of the cylinder 1434 opposite the side on which the compression spring 1440 is located. The other end of the flexible hose 1446 is connected to a pressure source (not shown in the drawings) through an actuator such as a pressure control valve. Unless pressure is applied to the liquid chambers 1444 of the power cylinders according to the state of the actuator instructed by the ECU 4, the second ends 1431 of the arms 1416 are located in relatively inner positions as shown in FIG. 17A, so that the anti-roll rate of the stabilizer is low.

On the contrary, when the actuator is operated by the ECU 4 to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as indicated by imaginary lines, i.e., double dotted chain lines, in FIG. 17A, to increase the arm ratio of the stabilizer to raise its stiffness against the rolling of the vehicle.

Figure 18A:
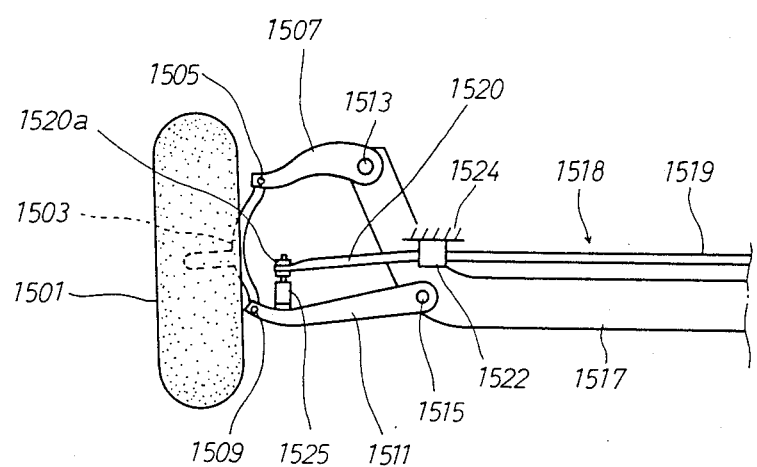
FIG. 18A is a plan view partially showing operated state of the sixth example.
Figure 18B:
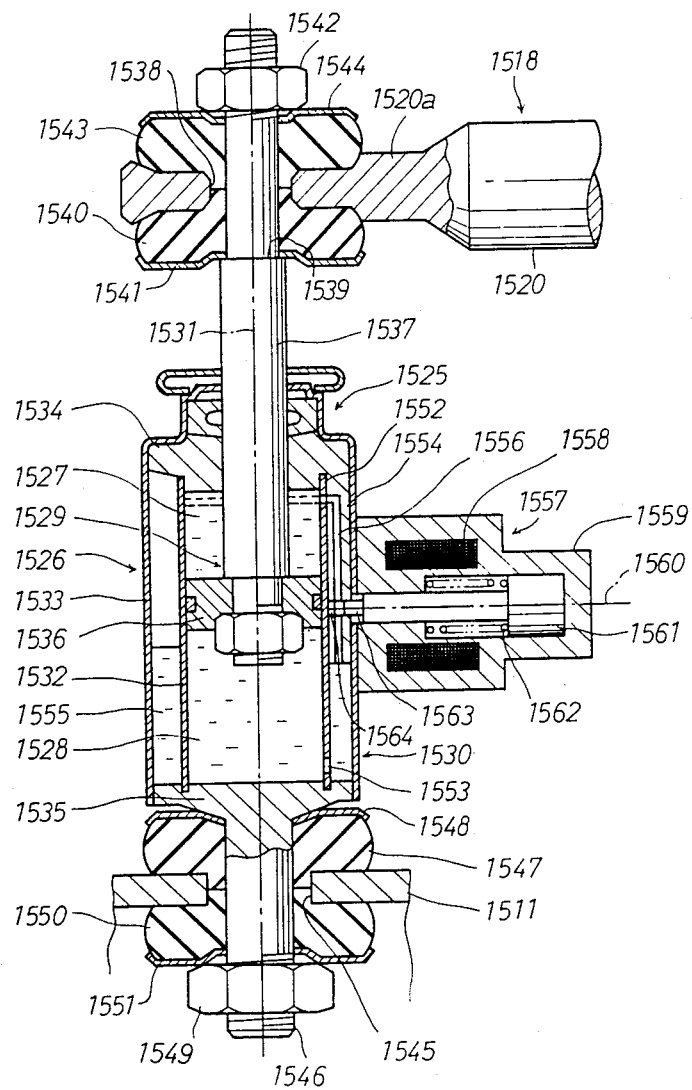
FIG. 18B is an enlarged cross-section of a coupling unit shown in FIG. 18A.

FIGS. 18A and 18B show a construction of a coupling unit for a stabilizer and a lower control arm, as the sixth example.

FIG. 18A shows a partial front view of a wishbone-type suspension including a coupling unit for a stabilizer of a vehicle. FIG. 18B shows an enlarged sectional view of the coupling unit shown in FIG. 18A. In the drawings, a wheel 1501 is rotatably supported by a knuckle 1503. The knuckle 1503 is pivotally coupled at the upper end to one end of an upper control arm 1507 by means of a pivot 1505, and is pivotally coupled at the lower end to one end of a lower control arm 1511 by means of a pivot 1509. The upper control arm 1507 and the lower control arm 1511 are pivotally coupled to a cross member 1517 of the vehicle by pivots 1513 and 1515. A stabilizer 1518, which is U-shaped, is disposed along the width of the vehicle as shown in FIG. 18A. The stabilizer 1518 is coupled at its central rod 1519 to the body 1524 of the vehicle by brackets 1522 by means of rubber bushes (not shown in the drawing), so that the stabilizer can be rotated around its axis. The tip 1520a of an arm 1520 of the stabilizer 1518 is coupled to one portion near one end of the lower control arm 1511 by a coupling unit 1525. FIG. 18B shows the coupling unit 1525 including a piston-cylinder assembly 1526. The piston-cylinder assembly 1526 includes a piston 1529 and a cylinder 1530 which cooperate with each other to define two cylinder chambers 1527 and 1528. The cylinder 1530 includes an inner cylinder 1532 which supports the piston 1529 for movement back and forth along an axis 1531, an outer cylinder 1533 disposed concentrically to the inner cylinder 1532, and end caps 1534 and 1535 which close both the ends of the inner cylinder and the outer cylinder. The piston 1529 includes a main portion 1536 and a piston rod 1537, which bears the main portion 1536 at one end thereof and which extends along the axis 1531 through the end cap 1534 and the hole 1538 of the tip 1520a of the arm 1520 of the stabilizer 1518.

A rubber bush 1540 and a retainer 1541 for holding the bush are interposed between a shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is disposed with through holes 1552 and 1553 near the end caps 1534 and 1535. The end cap 1534 is integrally provided with a projection 1554 which extends along the axis 1531 between the inner cylinder 1532 and the outer cylinder 1533 and is located in tight contact with the inner and outer cylinders. The projection 1554 has an internal passage 1556 which is coincident at one end with the through hole 1552 and is open at the other end into an annular space 1555 between the inner cylinder 1532 and the outer cylinder 1533. As a result, the through hole 1552, the internal passage 1556, the annular space 1555 and the other through hole 1553 define a passage means for connecting both the cylinder chambers 1527 and 1528 to each other. A part of the annular space 1555 is filled with air. The cylinder chambers 1527 and 1528, the internal passage 1556 and the remaining part of the annular space 1555 are filled with oil. The change in the volume of the piston rod 1537 in the cylinder 1530, which is caused by the displacement of the piston 1529 from the cylinder 1530, is compensated for by compression or expansion of the air filled in the part of the annular space 1555.

The connection of the internal passage 1556 is selectively controlled by a normally-opened solenoid valve 1557. The solenoid valve 1557 includes a core 1561, a compressed helical spring 1562 and a housing 1559 with a solenoid 1558. The housing 1559 is secured at one end on the outer cylinder 1533. The core 1561 is supported in the housing 1559 for movement back and forth along an axis 1560. The compressed helical spring 1562 presses the core 1561 rightward in FIG. 18B. A valve element 1563 is integrally formed as one piece at one end of the core 1561 to be selectively fitted into a hole 1564 extending to penetrate the internal passage 1556 of the projection 1554 in the horizontal direction.

When no electricity is applied to the solenoid 1558 according to an instruction from the ECU 4, the core 1561 is pressed rightward in the drawing by the compressed helical spring 1562 so as to open the valve 1557 to connect the internal passage 1556. Conversely, when electricity is applied to the solenoid 1558 according to an instruction from the ECU 4, the core 1561 is driven leftward in the drawing against the force of the compressed helical spring 1562 so as to fit the valve element 1563 into the hole 1564 to isolate the internal passage 1556.

In the coupling unit constructed as above, when electricity is applied to the solenoid 1558 of the solenoid valve 1557, the solenoid valve 1557 is closed so as to disconnect the cylinder chambers 1527 and 1528 from each other. Thus, oil in one cylinder chamber is kept from flowing to the other cylinder chamber, so that the piston 1529 is hindered from moving relative to the cylinder 1530 along the axis 1531. As a result, the stabilizer 1518 works for suppressing the rolling of the vehicle so as to keep good control and high stability of the vehicle even when one of the wheels rides over a bump or through a dip in a road surface.

Conversely, when no electricity is applied to the solenoid 1558, the solenoid valve 1557 is maintained in an open position shown in FIG. 18B, so that oil in both the cylinder chambers 1527 and 1528 can freely flow to each other via the internal passage 1556 and so forth. As a result, the piston 1529 can be smoothly moved in the cylinder 1530 so that the tips of both the right and left arms 1520 can be smoothly moved around the corresponding lower control arms 1511. Since the stabilizer does not work this time, the damping force for rear wheels of the vehicle is reduced to maintain good riding comfort.

Some embodiments of the present invention has been described in detail above, this description is not intended to limit the scope of the present invention beyond the appended claims. Moreover, other embodiments of the present invention are possible without departing from the scope of the present invention.

What is claimed is:

1. A suspension controller for a vehicle comprising:
    a vehicle height detection means for detecting a vehicle height at a front wheel and for generating vehicle height signal;
    a vehicle height determination means for receiving said vehicle height signal and comparing said vehicle height signal with a predetermined reference value so as to generate a vehicle height determination signal;
    a cycle time determination means for detecting a cycle time of each said vehicle height signal, said cycle time being indicative of the vibration of the vehicle, and comparing the detected cycle time with a predetermined reference value corresponding to a period of resonant vibration of an unsprung mass of said vehicle, so as to generate a cycle time determination signal;
    a control means for receiving said vehicle height determination signal and said cycle time determination signal so as to generate a suspension characteristic alteration signal based on said vehicle height determination signal and said cycle time determination signal; and
    a suspension characteristic alteration means for altering a suspension charteristic of said vehicle in response to said suspension characteristic alteration signal.

2. A suspension controller for a vehicle as claimed in claim 1, wherein:
    said vehicle includes front wheels and rear wheels and said vehicle height detection means is provided substantially between each said front wheel and said vehicle body, and substantially between each said rear wheel and said vehicle body;
    said vehicle height determination means receives a vehicle height signal from each of the front and the rear wheels, and compares each of said vehicle height signals with a reference value so as to generate each vehicle height determination signal; and
    said cycle time detection means receives said vehicle height signals from the front and rear wheels and detects the cycle time of each of said vehicle height signals, each said cycle time being indicative of the degree of vibration, and compares each cycle time with a predetermined reference value corresponding to a period of resonant vibration of said unsprung mass, so as to generate a cycle time determination signal.

3. A suspension controller for a vehicle as claimed in claim 1, wherein:
    said vehicle height determination means generates the vehicle height determination signal in response to a vehicle height signal having an amplitude greater than the predetermined reference value;
    said cycle time determination means generates the cycle time determination signal in response to a cycle time of the vehicle height signal which is within a predetrmined range corresponding to a period of resonant vibration of said unsprung mass; and
    said control means generates the suspension characteristic alternation signal to alter the suspension characteristic to a 'HARD' state in response to the vehicle height determination signal and the cycle time determination signal.

4. A suspension controller for a vehicle as claimed in claim 2, wherein:
    said vehicle height determination means generates the vehicle height determination signal when the amplitude of either of the vehicle height signals of the front and rear wheels is greater than the predetermined reference value and also, when the product of the displacement of the front vehicle height signal from the reference value and the displacement of the rear vehicle height signal from the reference value is negative;

said cycle time determination means generates the cycle time determination signal when the cycle time of at least one of the front vehicle height signal and the rear vehicle height signal is within a predetermined range corresponding to a period of resonant vibration of said unsprung mass; and said control means generates the suspension characteristic alteration signal for altering the suspension characteristic to a 'HARD' state in response to the vehicle height determination signal and the cycle time determination signal.

* * * * *